US012762272B2

(12) United States Patent
Vikramaratne et al.

(10) Patent No.: US 12,762,272 B2
(45) Date of Patent: Oct. 13, 2026

(54) SYNTHETIC TRAINING DATASETS FOR PERSONALLY IDENTIFIABLE INFORMATION CLASSIFIERS

(71) Applicant: Box, Inc., Redwood City, CA (US)

(72) Inventors: Victor De Vansa Vikramaratne, Sunnyvale, CA (US); Kave Eshghi, Los Altos, CA (US); Thuy Nguyen, San Francisco, CA (US); Alok Ojha, Newark, CA (US)

(73) Assignee: Box, Inc., Redwood City, CA (US)

( * ) Notice: Subject to any disclaimer, the term of this patent is extended or adjusted under 35 U.S.C. 154(b) by 925 days.

(21) Appl. No.: 17/589,610

(22) Filed: Jan. 31, 2022

(65) Prior Publication Data

US 2023/0244811 A1 Aug. 3, 2023

(51) Int. Cl.
*G06F 21/62* (2013.01)
*G06F 16/93* (2019.01)

(52) U.S. Cl.
CPC .......... *G06F 21/6245* (2013.01); *G06F 16/93* (2019.01); *G06F 21/6272* (2013.01)

(58) Field of Classification Search
CPC ... G06F 21/6245; G06F 21/6272; G06F 16/93
See application file for complete search history.

(56) References Cited

U.S. PATENT DOCUMENTS 11,496,286 B2 * 11/2022 Duffy .................... G06F 40/117
12,086,851 B1 * 9/2024 Arici .................. G06Q 30/0631
2018/0018577 A1 * 1/2018 Fink ....................... G06N 5/022
2019/0108114 A1 * 4/2019 De Vansa Vikramaratne .............. G06N 20/00
2020/0065313 A1 * 2/2020 Patel ..................... G06F 16/288
2021/0089667 A1 * 3/2021 Kadiyala ............. G06F 21/6245
2021/0334407 A1 * 10/2021 North .................. G06F 16/2445
2022/0245283 A1 * 8/2022 Springer ................. G06F 21/84
2022/0382902 A1 * 12/2022 Panikkar ................ G06N 20/00
2023/0032208 A1 * 2/2023 Kobren ................. G06F 18/214
(Continued)

OTHER PUBLICATIONS

Shin, R., et al., "Synthetic Datasets for Neural Program Synthesis," ICLR, Dec. 2019.
(Continued)

*Primary Examiner* — Jung W Kim
(74) *Attorney, Agent, or Firm* — Vista IP Law Group, LLP

(57) ABSTRACT

Handling user-demanded privacy controls over data of an electronic document collaboration system. A storage facility is configured to store content objects and associated metadata that pertains to the content objects. A user raises a privacy action request that comprises a demand to change how certain content objects that contain personally identifiable information (PII) of the user are handled. A plurality of content objects are classified using a PII classifier that is trained using synthetically-generated training set entries where, rather than reading actual contents from electronic documents of the collaboration system to generate training set entries, instead, the training set entries are generated using words that are randomly selected from a repository of natural language words. When PII corresponding to the user who raised the privacy action request is discovered in content objects, then the content management system modifies those content objects and/or its metadata in accordance with the demand.

20 Claims, 12 Drawing Sheets

(56) References Cited

U.S. PATENT DOCUMENTS

| | | | | |
|---|---|---|---|---|
| 2023/0080686 | A1 * | 3/2023 | Gupta | G06F 16/221 726/26 |
| 2023/0108263 | A1 * | 4/2023 | Eneim | G06F 21/6254 726/29 |
| 2023/0195934 | A1 * | 6/2023 | Gustof | G06F 21/6245 726/26 |

OTHER PUBLICATIONS

Lacoste, A., et al., "Synbols: Probing Learning Algorithms with Synthetic Datasets," 34th Conference on Neural Information Processing Systems, dated Nov. 2020.
Kar, A., et al., "Meta-Sim: Learning to Generate Synthetic Datasets," ICCV, dated 2019, pp. 4551-4560.
Angelidis, S., et al., "Summarizing Opinions: Aspect Extraction Meets Sentiment Prediction and They Are Both Weakly Supervised," Proceedings of the 2018 Conference on Empirical Methods in Natural Language Processing, pp. 3675-3686 Brussels, Belgium, Oct. 31-Nov. 4, 2018. Copyright 2018, Association for Computational Linguistics.
Karamanolakis, G, et al., "Leveraging Just a Few Keywords for Fine-Grained Aspect Detection Through Weakly Supervised Co-Training," Columbia University, New York, NY, dated 2019.
"Cloud Data Loss Prevention," Google, Date found via Internet Archives as Mar. 1, 2021, URL: https://cloud.google.com/dlp.
Karamanolakis, G., et al., "Training Neural Networks for Aspect Extraction Using Descriptive Keywords Only," Columbia University New York, NY, dated 2019, Published at the 2nd Learning from Limited Labeled Data Workshop.
Ayo-Akere, N., "Towards an Effective Social Engineering susceptibility detection Model Using Machine Learning on the Online Social Network," MSc Internship Cyber Security, School of Computing, National College of Ireland, dated Dec. 2019.
InfoTypes and infoType detectors, GoogleCloud, date found via Internet Archive as Mar. 6, 2021, URL: https://cloud.google.com/dlp/docs/concepts-infotypes.

* cited by examiner

SYNTHETIC TRAINING DATASETS FOR PERSONALLY IDENTIFIABLE INFORMATION CLASSIFIERS

TECHNICAL FIELD

This disclosure relates to content management systems, and more particularly to techniques for generating synthetic datasets for use in training personally identifiable information classifiers.

BACKGROUND

Cloud-based content management services and systems have impacted the way personal and enterprise computer-readable content objects (e.g., files, electronic documents, electronic spreadsheets, electronic images, programming code files, etc.) are stored, and have also impacted the way such personal and enterprise content objects are shared and managed. Today's content management systems provide the ability to securely share large volumes of content objects among trusted users (e.g., collaborators) on a variety of user devices such as mobile phones, tablets, laptop computers, desktop computers, and/or other devices. Modern content management systems can host many thousands or, in some cases, millions of files for a particular enterprise that are shared by hundreds or thousands of users.

Certain content objects managed by the content management systems may include personally identifiable information (PII). PII (e.g., social security numbers) may be included directly in the actual bits of the content objects (e.g., in tax forms, etc.) or may be extemporaneously embedded in other data (e.g., metadata) that is related to the content objects (e.g., a contact phone number entered in a chat conversation). Stewards of large volumes of electronic or computer-readable content objects (e.g., content management systems) must comply with the various laws, regulations, guidelines, and other types of governance that have been established to monitor and control the use and dissemination of personally identifiable information (PII) that might be contained in the content objects and/or its metadata. For example, in the United States, the federal statutes known as the Security Rule of the Health Insurance Portability and Accountability Act (HIPAA) was established to protect a patient's medial PII while still allowing digital health ecosystem participants access to needed protected health information (PHI). As another example, the California Consumer Privacy Act (CCPA) is a state statute intended to enhance privacy rights and consumer protection to California state residents. As yet another example, the European Parliament has enacted a series of legislation such as the General Data Protection Regulation (GDPR) to limit the distribution and accessibility of PII. While the definition and specific governing rules of PII may vary by geography or jurisdiction, the common intent of such governance is to provide a mechanism for the owner of PII to control access and distribution of their personally identifiable information.

In order for a computer to know how to process a document that contains PII (e.g., to comport with whatever laws are applicable to the handling of PII), the computer needs to know that the document contains PII. In some cases, the computer needs to know the type of PII in the containing document.

One way for the computer to assess whether or not a document contains PII is to apply syntactic rules over the document. For example, rules that match text patterns in a document to certain text patterns that are known to be indicative of PII can be applied over a document. For example, a document might be scanned to see if there are any occurrences of any social security number (SSN) patterns (e.g., "NNN-NN-NNNN", where N is a numeric digit). This technique might pick up occurrences of social security numbers, however this technique might also incorrectly classify many non-SSN occurrences (e.g., where a pattern such as 124-45-6789 refers to, for example, a product identifier).

A better way for the computer to assess whether or not a document contains PII is to train and use a machine learning model. In this technique, information beyond merely the text pattern is used to increase the classification accuracy. That is, context surrounding a candidate text pattern is used to classify a text pattern more accurately. For example, if it were known that the words in front of a candidate pattern appeared as, "My social security number is:", then a following text pattern matching "NNN-NN-NNNN" could be more confidently classified as an SSN. Machine learning models can be trained on phrases like "My social security number is:", or "My SSN is", or "SSN:" or other phrases that are determined to be good predictors that a following numeric pattern is indeed an SSN. In some cases, a very large number of phrases are used to train the machine learning model. Often, very large corpora of documents are processed to come up with a large number of phrases, which are then used to train a machine learning model.

Unfortunately, it can sometimes happen that all or portions of the foregoing large corpora of documents is not permitted to be used for machine learning model training purposes. In some cases, it can happen that there are no documents that can be permitted to be used for machine learning model training purposes and/or in a language of relevance. In some cases, it can happen that even when there are there are large corpora of electronic documents, legal issues prevent the stewards of large volumes of such electronic documents from using any portions of these electronic documents as a training set for a machine learning model. In such cases, there needs to be some means for training a machine learning model even in the presence of technical and/or legal issues that prevent using the foregoing a corpora of documents as training data.

Therefore, what is needed is a technique or techniques that address the problem of how to train a PII classifier when a real-world training set data is not available.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for generating and using synthetic datasets for training machine learning models, which techniques advance the relevant technologies to address technological issues with legacy approaches. More specifically, the present disclosure describes techniques used in systems, methods, and in computer program products for making document handling decisions based on machine learning classifiers that have been trained using synthetic datasets. Certain embodiments are directed to technological solutions for tuning synthetic datasets for PII models in a content management system setting.

The disclosed embodiments modify and improve over legacy approaches. In particular, the herein-disclosed techniques provide technical solutions that address the technical problems attendant to training a machine learning model when real-world training set data is not available. Such technical solutions involve specific implementations (e.g., data organization, data communication paths, module-to-module interrelationships, etc.) that relate to the software arts for improving computer functionality.

Such technical solutions involve specific implementations that relate to the software arts for improving computer functionality. Specifically, various applications of the herein-disclosed improvements in computer functionality serve to reduce demand for computer memory, reduce demand for computer processing power, reduce network bandwidth usage, and reduce demand for intercomponent communication. For example, in the situation where a first entity's data cannot be used to form a training dataset that is then used in a machine learning context to process documents of a second entity, it emerges that training a single model with synthetic data (i.e., such as is disclosed herein) is much more efficient than training many different models for many different tenants. More specifically, both memory usage and CPU cycles demanded are significantly reduced when training a single model with synthetic data as compared to the memory usage and CPU cycles that would be needed for training many different models for many different tenants.

The ordered combination of steps of the embodiments serve in the context of practical applications that perform steps for tuning synthetic datasets in a content management system setting. These techniques for tuning synthetic datasets for PII models in a content management system setting overcome long standing yet heretofore unsolved technological problems. These problems are technical problems that arise in the realm of computer systems. Specifically, the herein-disclosed embodiments for tuning synthetic datasets for PII models in a content management system setting are technological solutions pertaining to technological problems that arise in the hardware and software arts that underlie electronic document collaboration systems. Aspects of the present disclosure achieve performance and other improvements in peripheral technical fields including, but not limited to, machine learning and language-independent computing.

Some embodiments include a sequence of instructions that are stored on a non-transitory computer readable medium, which sequence of instructions are configured to implement a method for training a PII classifier. In some such embodiments, the method includes generating PII classifier training set entries by (1) providing a hintword in association with a corresponding infotype, (2) providing an n-gram, wherein constituent words of the n-gram are randomly selected from a repository of natural language words, and (3) injecting the hintword into the n-gram. The hintword of the n-gram is associated with an infotype such that when a PII classifier is trained with such synthetic training set entries, the PII classifier can be tuned to such a high degree of accuracy with respect to precision and recall of the infotype that the results of the PII classifier can be used in making highly accurate privacy-oriented decisions.

Some embodiments include a sequence of instructions that are stored on a non-transitory computer readable medium. Such a sequence of instructions, when stored in memory and executed by one or more processors, causes the one or more processors to perform a set of acts for tuning synthetic datasets for PII models in a content management system setting.

Some embodiments include the aforementioned sequence of instructions that are stored in a memory, which memory is interfaced to one or more processors such that the one or more processors can execute the sequence of instructions to cause the one or more processors to implement acts for tuning synthetic datasets for PII models in a content management system setting.

In various embodiments, any combinations of any of the above can be organized to perform any variation of acts for generating high-performance synthetic datasets to train a PII classifier, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
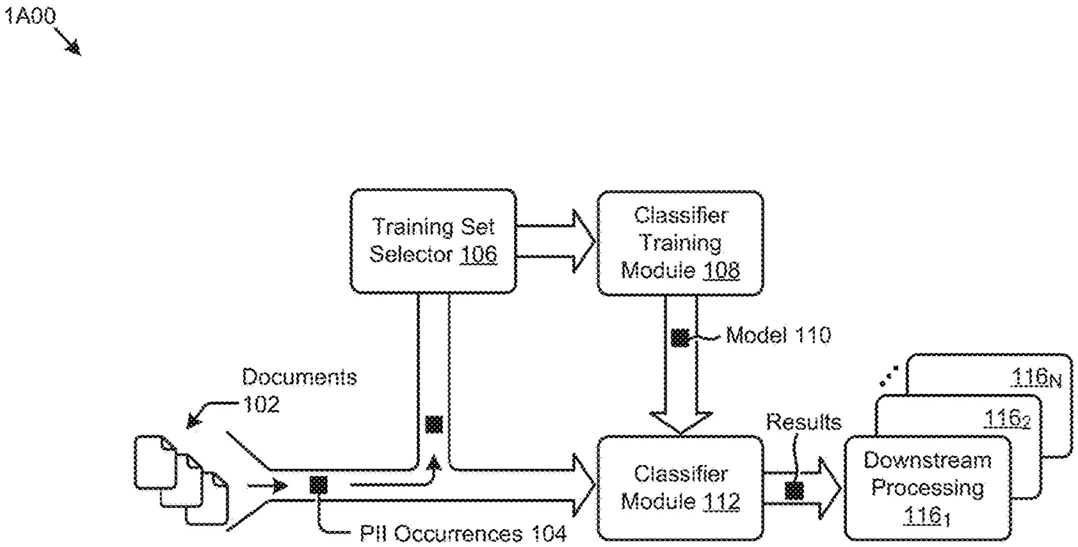
FIG. 1A shows a PII detection system that uses a portion of naturally-occurring documents as inputs to a classifier training module.

Aspects of the present disclosure solve problems associated with using computer systems for training a machine learning model when real-world training set data is not available. These problems arise in the context of computer-implemented collaboration systems. Some embodiments are directed to approaches for tuning synthetic datasets for high-performance PII detection in a content management system setting where there are many different tenants. The accompanying figures and discussions herein present example environments, systems, methods, and computer program products for generating high-performance synthetic datasets to train a PII classifier.

Overview

Acts for configuring a natural language classifier (e.g., a machine learning model, a neural network, etc.) often have a reliance on a training phase, where some selected portions of various corpora of data are used to train (e.g., using labels, in a supervised manner or using various forms of unsupervised training) a model to classify a passage. In doing so, various features (i.e., input signals) are taken from the various corpora of data associated with corresponding classifier results (i.e., outcomes, predictions). More or different portions of various corpora of data can be selected to form a training dataset. Certain of the contents of the training dataset is added or deleted or specially selected so as to improve the accuracy (e.g., precision and recall) of the trained model.

In some situations, however, there is no pre-existing corpora of data from which portions of the data can be drawn to form a training dataset. This might be because there simply is no such pre-existing corpora of data at the time the model is being trained, or there might be technical problems and/or legal limitations as to why a particular corpora of data cannot be used to form a training dataset. Strictly as an example, there might be legal reasons why documents comprising a first entity's data cannot be used to form a training dataset that is used in a machine learning context to process documents of a second entity. Or it might happen that there is no pre-existing corpora of data in the language of relevance.

Even in any of the foregoing situations where there is no pre-existing data to form a "teacher", there still remains the problem of forming a dataset to be used for training. As disclosed herein, a synthetic dataset is formed by combining expert-identified "hintwords" with linguistic noise. Such a synthetic dataset can be used in lieu of real-world data.

Once a training set has been established using such a synthetic dataset, passages of incoming documents can be classified as containing particular information types, and/or passages of incoming documents can be classified as containing information that corresponds to specific types of information (e.g., PII). Classified passages can be provided to downstream operations which in turn can handle passages of the documents and/or the entirety of the document(s) as a whole in accordance with any of a broad range of document handling policies. As an example, downstream operations might set a retention period of the entire document based on the presence of PII and/or type of PII in the document. As another example of downstream processing, operators of a content management system might be compelled (e.g., governance dicta or by legal order) to sift through vast amounts of tenant data so as to redact or "eradicate" and/or "turn-over" any/all tenant data that contains PII. As such, downstream operations within the content management system might need to list or otherwise identify any/all tenant data that contains PII. In some cases, downstream operations serve to prepare a listing of all of the electronic documents of a particular tenant that contain PII. As yet another example, downstream operations might modify metadata of certain documents to limit sharing and/or dissemination of such documents based on the presence of PII in passages of the documents.

Further details regarding general approaches to limit sharing and/or dissemination of a document are described in U.S. application Ser. No. 16/553,073 titled "DYNAMICALLY GENERATING SHARING BOUNDARIES" filed on Aug. 27, 2019, which is hereby incorporated by reference in its entirety.

In some cases, the content management system might need to identify not only occurrences of tenant data that contains PII, but locations of such PII as well. In some cases, the operator of a content management system might be compelled to certify that all occurrences of tenant data that contains PII have been acted upon (e.g., deleted). This sets up the acute need for a highly tuned machine learning model that can very accurately discriminate between one type of PII and another type of PII. Yet, for reasons heretofore discussed, tenant data cannot be used. This limitation, combined with the acute need for a highly tuned machine learning model provides motivation for development of the herein-disclosed synthetic dataset techniques.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

Figure 1B:
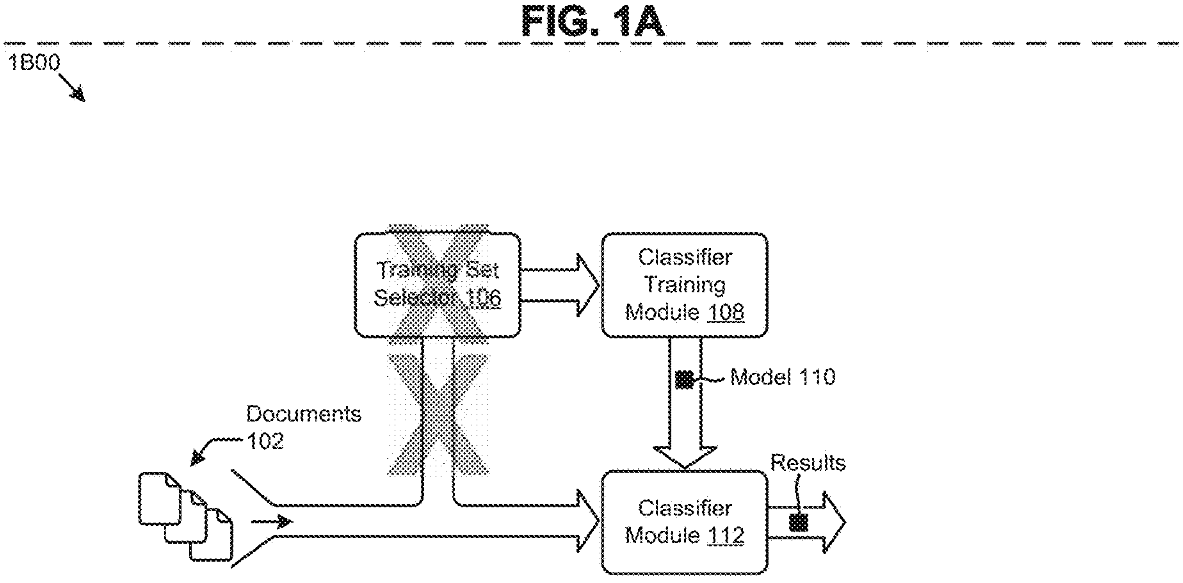
FIG. 1B shows a classifier training environment where a training dataset is not available.

FIG. 1A and FIG. 1B are being presented to draw out the differences between systems for detection of PII that use all or parts of tenant-provided documents as inputs to a classifier training module as contrasted with systems for detection of PII that use no parts of tenant documents as inputs to a classifier training. Some differences are presented in Table 1, and are further discussed as pertains to FIG. 1A.

TABLE 1

| Comparisons | | |
|---|---|---|
| Feature | System of FIG. 1A | System of FIG. 1B |
| Use of given documents | Given documents are used both for classifier training as well as during classification | Given documents are used only during classification |
| Selection of training data | A training set selector parses portions of the given documents for use by a classifier training module | There is no training set selector; no parts of tenant documents are used as inputs to the classifier training module |

FIG. 1A, shows a PII detection system that uses a portion of naturally-occurring documents as inputs to a classifier training module. While this may be effective in some environments, there are other environments where use of any portions of naturally-occurring documents as inputs for classifier training is strictly forbidden.

It is useful to explain how the legacy system 1A00 of FIG. 1A works before considering how to solve the problem introduced by the situation where no portions of naturally-occurring documents can be used as inputs for classifier training. In the legacy system of FIG. 1A, a portion of a given set of documents 102 is selected and then used for training a classifier. As shown, training set selector 106 passes some portion of documents 102 to classifier training module 108, which in turn generates model 110 that forms the basis for classification of portions of the documents as corresponding to PII occurrences 104. In particular, when a trained PII classifier (e.g., classifier module 112) receives documents 102, then on the basis of the trained model (e.g., model 110) the classifier emits results, which in turn are used to effect various forms of downstream processing (downstream processing $\mathbf{116}_1$, downstream processing $\mathbf{116}_2$, . . . , downstream processing $\mathbf{116}_N$).

This system serves suitably in a wide range of situations, however there are certain situations where documents 102 cannot be used to train the classifier module. In particular, there are situations where, due to privacy considerations and/or governance regulations and/or other considerations, documents "belonging" to one entity (e.g., Company A) cannot be used for training a model that is used to classify documents belonging to a different entity (e.g., Company B). This situation arises particularly when the documents are known or suspected to contain PII. As such, this situation (e.g., where a training dataset is not available) leads to the conclusion that the personally identifiable information detection system of FIG. 1A becomes problematic when there are two or more different entities. This is because there are strict privacy rules that prevent cross-pollination of data between tenants. That is, although data of "Tenant A" could be used to train a classifier that is used only on documents belonging to "Tenant A", that same classifier could not then be used to classify documents belonging to "Tenant B". One possibility around this is to deploy a different, tenant-unique classifier system for each tenant. While possible, this approach leads to unwanted deployments where variations of classifier accuracy depend on the nature of the corpora of customer data. Moreover, deploying a different, tenant-unique classifier system for each tenant is not scalable.

FIG. 1B shows a classifier training environment 1B00 where a training dataset is not available. More specifically, there are no user documents available to the training set selector, and thus, there are no user documents than can be input into classifier training module 108 to generate a model 110. Nevertheless, a training set is needed. Thus, what is needed is a way to train a classifier—yet without using any portion of the user documents to be classified. One approach to this problem is to synthetically construct the data that is used for training—without using any of the documents that are to be classified. Many possible ways to synthetically construct the data that is used for training are shown and described hereunder. Further, possible embodiments of systems that use synthetic datasets to train personally identifiable information classifiers are presented as pertains to FIG. 1C and FIG. 1D.

Figure 1C:
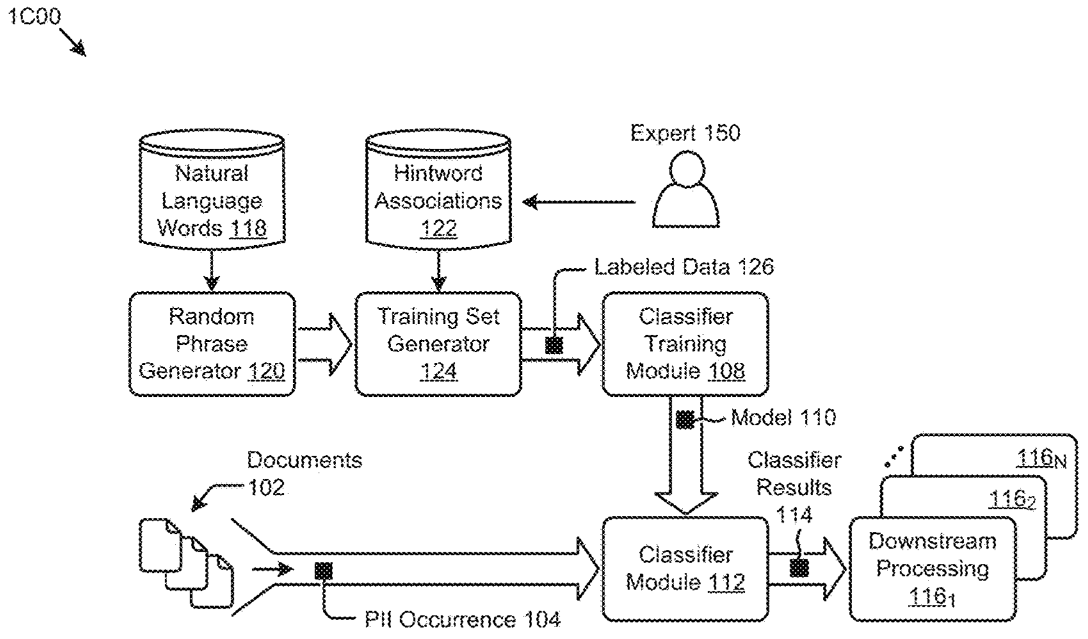
FIG. 1C and FIG. 1D show various personally identifiable information detection system configurations that use synthetic datasets to train personally identifiable information classifiers, according to some embodiments.
Figure 1D:
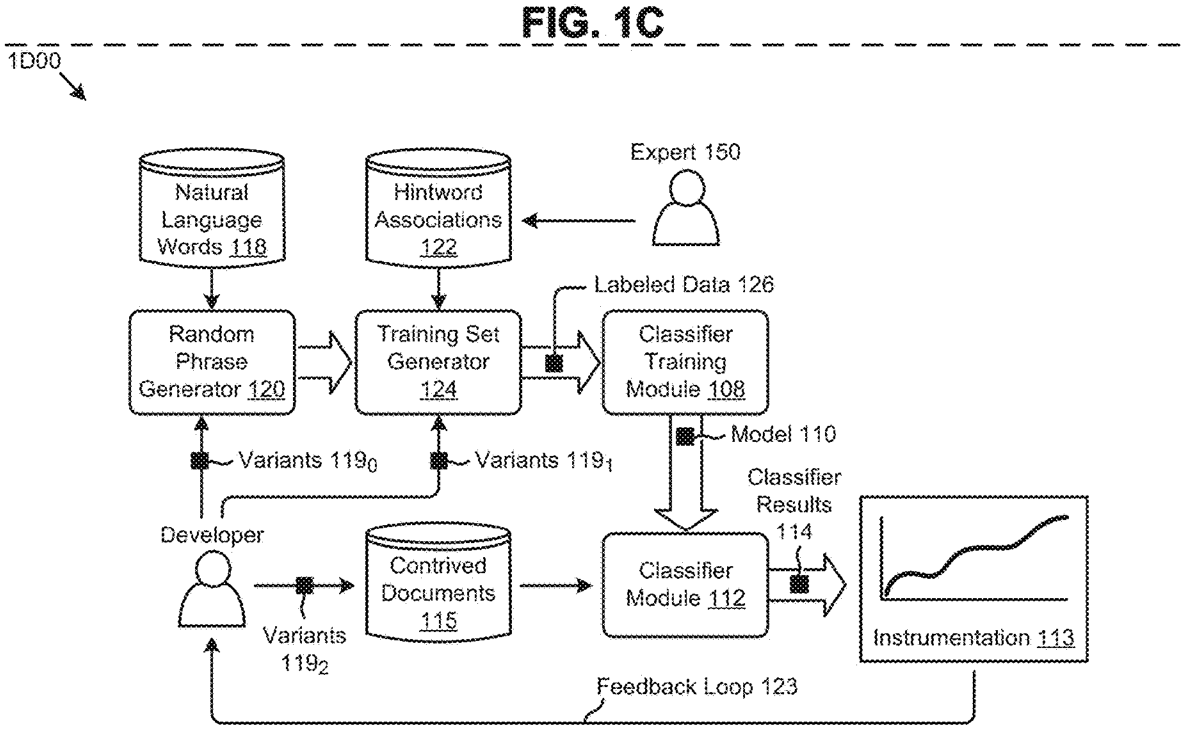

FIG. 1C and FIG. 1D show various personally identifiable information detection system configurations that use synthetic datasets to train personally identifiable information classifiers. As an option, one or more variations of personally identifiable information detection system configuration 1C00 or alternate personally identifiable information detection system configuration 1D00 or any aspects thereof may be implemented in the context of the architecture and functionality of the embodiments described herein and/or in any environment.

The embodiment of FIG. 1C shows how a classifier can be trained without using any documents that contain actual user documents or other tenant information. More specially, the embodiment of FIG. 1C shows how a classifier can be trained using natural language words 118 in combination with hintword associations 122, which hintword associations comprise expert-provided "hintwords" and which hintwords correspond to particular types of PII. For example, an expert 150 might associate the word "born" with PII referring to ones "birthday". This type of hintword-to-PII association can be used in conjunction with the foregoing random natural language phrases to create labeled data 126. To emphasize, none of the shown documents 102 are used by classifier training module 108. Nevertheless, classifier module 112 is able to be trained so as to accurately classify a passage as PII. Moreover, classifier module 112 is able to be trained so as to accurately classify a PII occurrence 104 as being of one or another type of PII. Such classification is codified in classifier results 114, which are the used for downstream processing (downstream processing $\mathbf{116}_1$, downstream processing $\mathbf{116}_2$, . . . , downstream processing $\mathbf{116}_N$).

In the embodiment of FIG. 1C, training set generator 124 combines (potentially) a large number of random phrases (e.g., as output by the shown random phrase generator 120) with hintwords drawn from the shown hintword associations 122. Such combinations (e.g., combinations of hintwords and random phrase noise) serve to form a synthetic training set that is generated without ever reading any portion of the tenant's documents. Accordingly, classifier module 112 can operate based on a model 110 that is constructed using the synthetic training set that is generated without ever reading any portion of the tenant's documents.

As is understood in machine learning arts, a classifier model can be measured for accuracy (e.g., precision and recall). Moreover, the qualities of the particular dataset used to train a classifier model can be measured and then improved (e.g., by a developer) based on a feedback loop.

FIG. 1D shows a personally identifiable information detection system configuration 1D00 that includes such a feedback loop. The system of FIG. 1D differs from the system of FIG. 1C, at least in that the system of FIG. 1D employs a set of contrived documents 115 and instrumentation 113. A developer can hand-construct contrived documents based on measurements emitted by, or evident from outputs of the instrumentation (e.g., precision and recall values).

Furthermore, the developer might modify the behavior of the random phrase generator 120, and/or the developer might modify the behavior of the training set generator 124, and/or the developer might modify the constituency of contrived documents 115, and/or the developer might modify the contents of hintword associations 122 (e.g., by adding secondary and/or tertiary hintwords). Modification of the behavior of random phrase generator 120 and/or the behavior of the training set generator 124 can be carried out in a development loop until such time as the classifier module is as accurate as is demanded by the developer. Strictly as example techniques for how to achieve such behavioral modification, as development continues through the feedback loop 123, the developer might introduce variants $\mathbf{119}_0$ into the random phrase generator 120, and/or the developer might introduce variants $\mathbf{119}_1$ into the training set generator 124, and/or the developer introduce variants $\mathbf{119}_2$ into the constituency of contrived documents 115, etc.

In some situations, the developer might tune the contrived documents (e.g., to achieve a particular precision and recall of the classifier module) by explicitly varying the distance between hintwords in passages of the contrived documents. As one particular technique for varying the distance between hintwords in passages of the contrived documents, the developer might vary the length of a prefix phrase that occurs before a hintword. As another particular technique for varying the distance between hintwords in passages of the contrived documents, the developer might vary the length of a suffix phrase that occurs after a hintword. As another particular technique for varying the distance between hintwords in passages of the contrived documents, the developer might vary the length of a prefix phrase that occurs before a hintword.

As development continues through the loop, the performance of the synthetic dataset trends toward a particular desired accuracy of the classifier module until such time as the synthetically-trained classifier module is as accurate as is demanded by the developer.

Figure 2A:
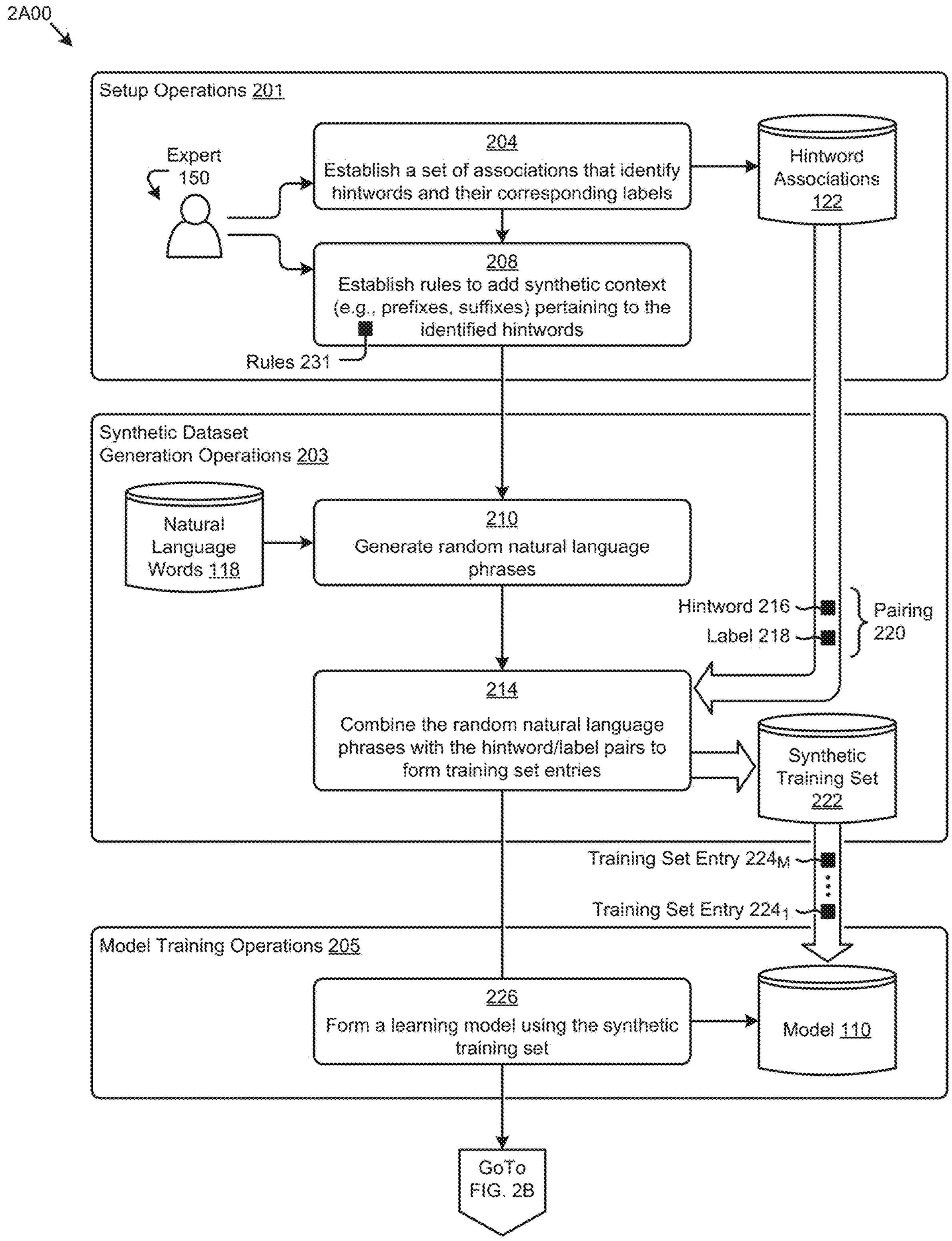
FIG. 2A depicts a processing flow that generates high-performance synthetic datasets to train a machine learning model, according to some embodiments.
Figure 2B:
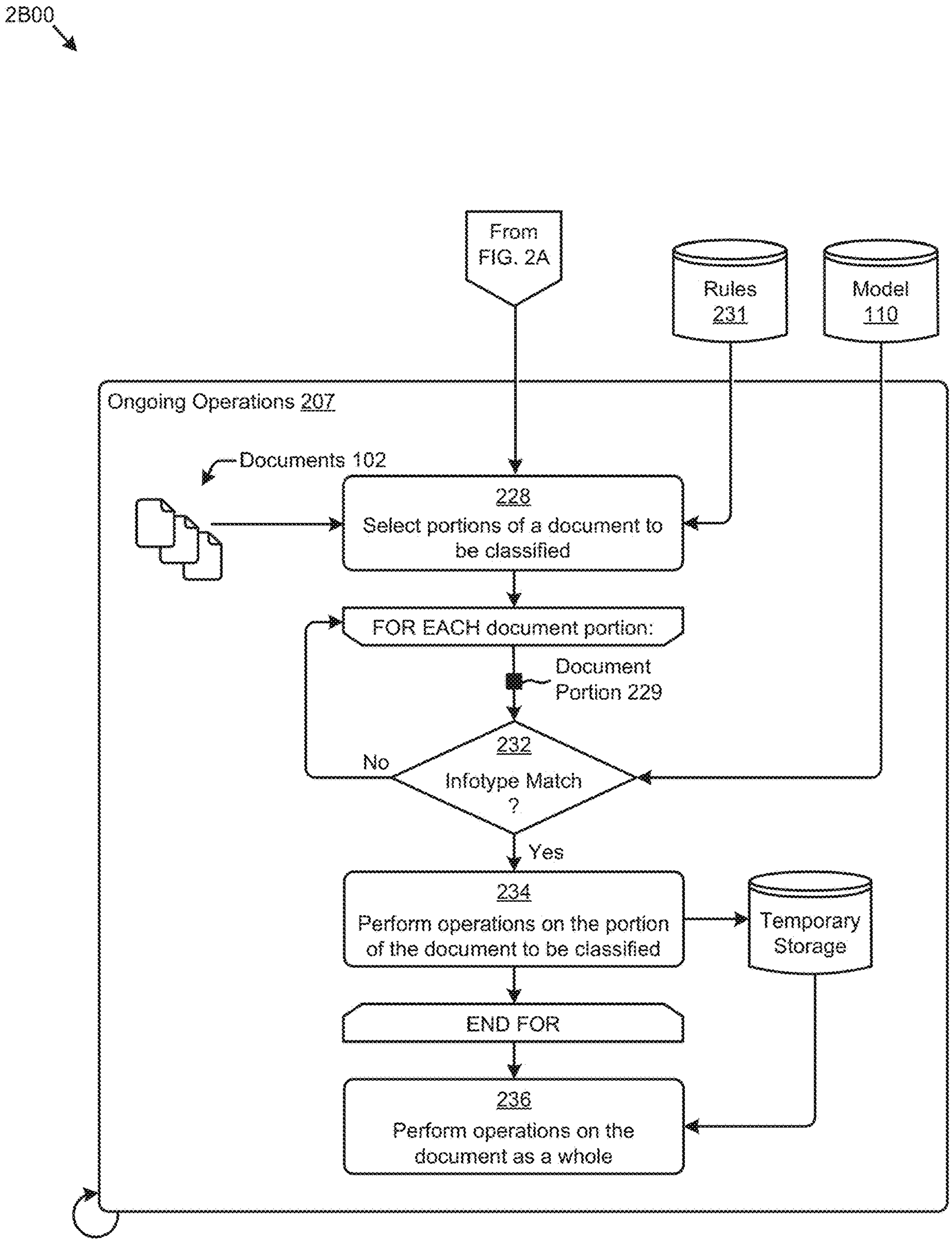
FIG. 2B depicts a use case that carries out ongoing operations to identify occurrences of personally identifiable information in a given set of documents, according to some embodiments.

Details of various techniques for making and using high-performance synthetic datasets are shown and described as pertains to FIG. 2A and FIG. 2B.

FIG. 2A depicts a processing flow 2A00 that generates high-performance synthetic datasets to train a machine learning model. As an option, one or more variations of processing flow 2A00 or any aspect thereof may be implemented in the context of the architecture and functionality of the embodiments described herein and/or in any environment.

The figure is being presented to illustrate how a flow of operations can interrelate hintword associations and random natural words in a manner that results in a trained learning model. More specifically, the figure is being presented to illustrate how the flow of operations can result in a trained learning model—even though no tenant document is ever read for training the learning model.

As shown, the flow of operations can be partitioned into a series of setup operations 201, synthetic dataset generation operations 203, and model training operations 205.

In this embodiment, the setup operations commence when an expert 150 establishes a set of associations that identify hintwords and their corresponding labels (step 204). Such hintwords and their corresponding labels are stored in hintword associations 122, which hintword associations are used in subsequent operations (e.g., when processing the shown synthetic dataset generation operations 203). In this particular embodiment, the hintword associations are formed by pairing 220 between a particular hintword 216 and a corresponding associated label 218. For example, the hintword "credit" might be found in a pairing with the label "CC" (referring to a credit card number). As another example, the hintword "social" might be found in a pairing with the label "SSN" (referring to a social security number). Pairing can be accomplished using any know technique. For example, a hintword and its label can be entered into the same row of a table. As another example, any number of hintwords (e.g., in an ordered set or list) can be associated with corresponding references to labels (e.g., also in an ordered set or list).

The expert might establish rules 231 to add context (e.g., prefixes, suffixes) around the identified hintwords (step 208). That is, the expert might establish a prefix context insertion rule such as "generate 20 natural language words as a prefix before a hintword." Similarly, the expert might establish a suffix context insertion rule such as "generate 20 words to follow a detected occurrence of a hintword." Such rules, or inferences from such rules, or other mechanisms for extracting context that surrounds a hintword or hintwords, can be used (1) during the machine learning model training phases (e.g., when injecting hintwords into random natural language phrases), as well as (2) during classification phases (e.g., when extracting context from documents).

As used herein, the term "hintword" may refer to an n-gram, where the n-gram is a natural language word (in any language) where the natural language word is found within a larger n-gram that refers to a particular infotype.

As used herein an infotype is a name or characteristic of a person, place or thing, or time. In some of the disclosed embodiments, one or more infotypes are identified in a passage, and the occurrence of such one or more infotypes are in turn used for classifying the passage as containing PII.

After performing at least a portion of setup operations 201, synthetic dataset generation operations can commence. Constituents of randomly-selected n-grams (e.g., words, phrases) are drawn from a repository of natural language words 118, which randomly-selected n-grams are then combined with the foregoing hintword associations so as to generate any number (possibly a large number) of training set entries that constitute a synthetic training set 222. Specifically, step 210 serves to generate random natural language phrases while step 214 combines the random natural language phrases with hintword-label pairs. In some cases, hintwords are injected into a middle portion of the random natural language phrases such that there is both prefix context (e.g., a portion of the random phrase that appears before the hintword) as well as suffix context (e.g., a portion of the random phrase that appears after the hintword).

Various techniques for injecting hintwords into a middle portion of the random natural language phrases can incorporate the notion of primary hintwords, secondary hintwords, tertiary hintwords, etc. For example, given the entries as shown in Table 2, the hintword entry in the first row can be considered a primary hintword, the hintword entry in the second row can be considered a secondary hintword, and the hintword entry in the third row can be considered a tertiary hintword.

TABLE 2

Primary, secondary, and tertiary hintword association examples

| Row | Hintword | Label (pertaining to a corresponding infotype) |
|---|---|---|
| 1 | "credit" | CC (credit card number) |
| 2 | "debit" | CC (credit card number) |
| 3 | "card" | CC (credit card number) |

Such primary and/or secondary and/or tertiary hintwords can be combined with any variation of length and/or boundaries of prefixes and suffixed to generate a training set entry. For example, a training set entry might include a first random natural language phrase, followed by a primary hintword, followed by a second random natural language phrase, followed by a secondary hintword, followed by a third random natural language phrase, followed by a tertiary hintword, etc.

Additionally or alternatively, such primary and/or secondary and/or tertiary hintwords can be combined with any variation of length and/or boundaries of prefixes and suffixed to generate a training set entry. For example, a first training set entry might include a random natural language prefix, followed by a primary hintword and followed by a random natural language suffix. And/or, a second training set entry might include a second random natural language prefix, followed by a secondary hintword and followed by a second random natural language suffix. And/or, a third training set entry might include a third random natural language prefix, followed by a tertiary hintword and followed by a third random natural language suffix.

Such synthetically-constructed multi-part phrases can then be associated with the label that corresponds to the primary, secondary, and tertiary hintwords. In the foregoing example, the synthetically-constructed multi-part phrase would be associated with the label "CC (credit card number) ". The designation of a "credit card" is merely one possible infotype that is deemed to be PII. Other infotypes pertaining to PII are possible. Moreover, infotypes that are not deemed to pertain to PII are possible. Strictly as one example, the infotype "Role" (e.g., CEO, CFO, Secretary, etc.) might be useful in improving precision and recall over an infotype that is deemed to be PII.

As used herein an infotype is a name or characteristic of a person, place or thing, or time. In some of the disclosed embodiments, one or more infotypes are identified in a passage, and the occurrence of such one or more infotypes are in turn used for classifying the passage as containing PII.

In still other cases, triples are drawn from (1) a random phrase that is deemed to be a prefix, (2) a hintword drawn from a randomly selected hintword association (e.g., pairing 220), and (3) a random phrase that is deemed to be a suffix. The triple is then associated with the label of the randomly selected hintword association. This process of generating triples can be repeated M number of times so as to generate a synthetic training set that includes M number of training set entries (e.g., training set entry $224_1$, . . . , training set entry $224_M$). As such, a synthetic training set of any size can be developed—yet without using any portion of tenant documents (and noting that documents 102 are not shown in FIG. 2A).

The synthetic training set is then used in model training operations 205. Specifically, M number of training set entries of the synthetic training set 222 are amalgamated to form model 110 (step 226). Model 110 is generated without reading any portion of tenant documents.

FIG. 2B depicts a use case 2B00 that carries out ongoing operations 207 to identify occurrences of personally identifiable information in a given set of documents. As an option, one or more variations of use case 2B00 or any aspect thereof may be implemented in the context of the architecture and functionality of the embodiments described herein and/or in any environment.

The figure is being presented to illustrate how model 110—that was generated without reading any tenant documents—can be used to identify occurrences of personally identifiable information in a given set of documents 102. Specifically and as depicted, rules 231 are applied to any one or more of documents 102. One result of application of such rules is that the contents of a document is apportioned into any number of document portions (step 228). The portions can be non-overlapping portions or the portions can be overlapping. In exemplary cases each portion contains at least one hintword.

A FOR EACH loop is entered within which loop each particular document portion 229 is checked for an occurrence of an infotype match. In checking for an occurrence of an infotype, model 110 is used. More specifically, the document portion is formatted into input signals to be applied to the model. The model in turn outputs one or more classification output signals, which in this embodiment is/are matches to particular one or more infotypes. In some embodiments, such matches to particular one or more infotypes correspond to match confidence values. For example, the model might output an infotype match on "credit card" with a confidence value of 80%. Additionally or alternatively, the model might output an infotype match on "debit card" with a confidence value of 30%.

In the case that decision 232 deems that the passage does contain at least one infotype match, possibly on the basis of breaching a threshold pertaining to the confidence value, then step 234 performs further operations on the particular document portion. For example, the further operations might involve annotating the document passage so as to identify the location in the passage where the infotype was matched. Additionally or alternatively, the further operations might involve annotating the document passage so as to identify the locations of the prefix portion and/or the suffix portion surrounding where the infotype was matched. In some cases the prefix portion and/or the suffix portion are themselves checked for an infotype match (e.g., by applying the prefix portion and/or the suffix portion as input signals to model 110). Results from performance of step 234 are stored, at least temporarily, so as to be available for downstream processing (e.g., once the shown FOR EACH loop has ended).

In some downstream processing situations, operations are performed on the document as a whole (step 236). Strictly as one example, if PII belonging to a particular person is found in any passage of a particular document, then any action compelled by governance dicta or by legal order can be taken over the document as a whole. In some cases, the governance dicta or legal order may require that the document be deleted. In other cases, the governance dicta or legal order may require that the document be placed under a legal hold.

Some or all of the foregoing decisions and operations might be implemented within the context of an electronic document collaboration system. Various possible electronic document collaboration systems configurations as used for processing personally identifiable information in a given set of documents are shown and described as pertains to FIG. 3A and FIG. 3B.

Figure 3A:
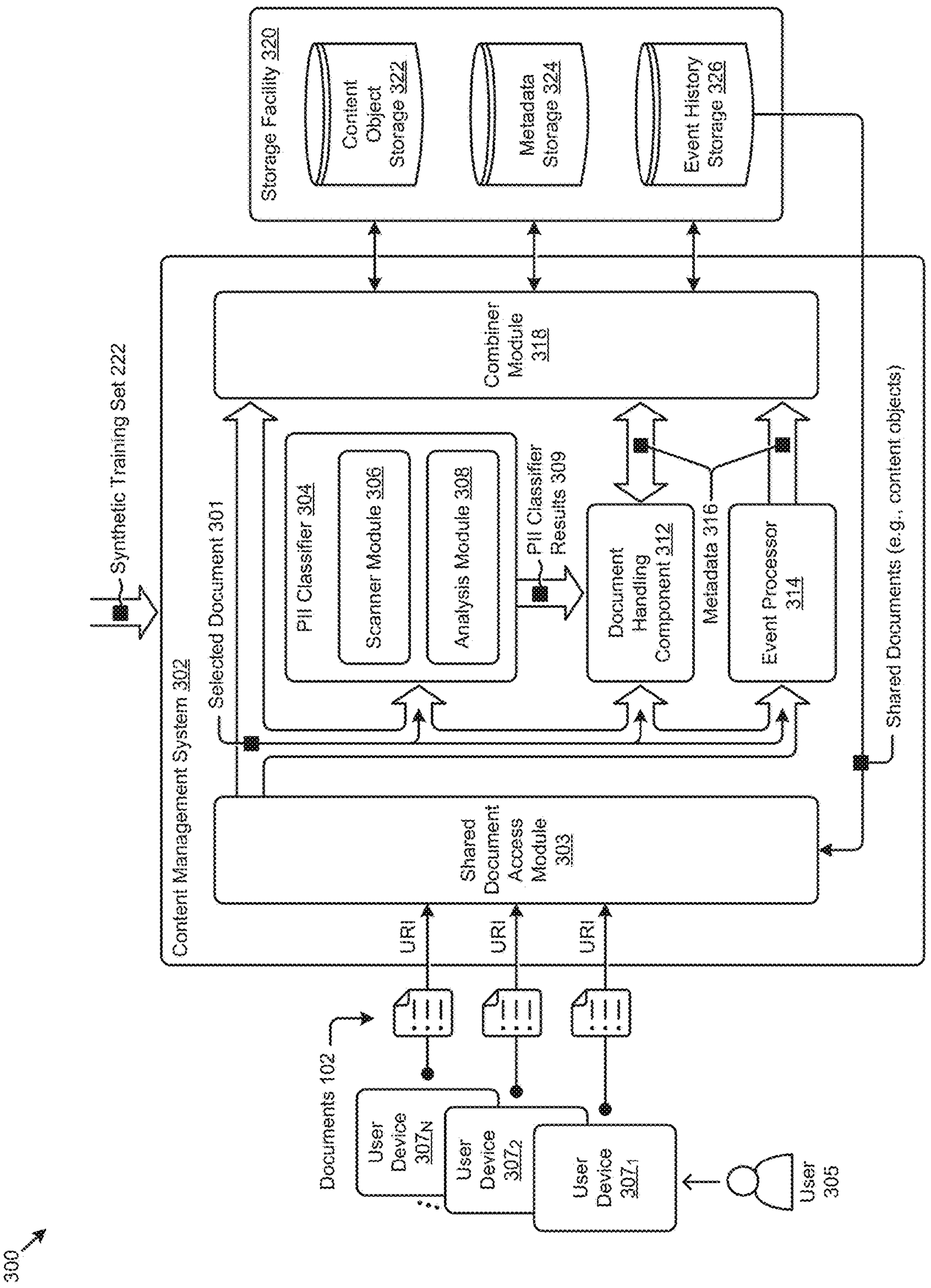
FIG. 3A and FIG. 3B depict example electronic document collaboration system configurations as used for processing personally identifiable information in a given set of documents, according to some embodiments.

FIG. 3A depicts a first example electronic document collaboration system 300 as used for identifying personally identifiable information in a given set of documents. As an option, one or more variations of electronic document collaboration system 300 or any aspect thereof may be implemented in the context of the architecture and functionality of the embodiments described herein and/or in any environment.

The figure is being presented to illustrate how PII classifiers such as the ones herein-described can be deployed within a content management system 302. More specifically, the figure is being presented to illustrate how documents 102 (e.g., documents that derive from user 305 through user device $\mathbf{307}_1$, device $\mathbf{307}_2$, and/or device $\mathbf{307}_N$) can be analyzed so as to tag the documents with metadata 316 that points out the existence and/or location of various types of PII in the documents.

A classifier system (e.g., PII classifier 304) and a document handling module (e.g., document handling component 312) operate in conjunction with a combiner module 318 so as to tag the documents with metadata that points out the existence and location of various types of PII in the documents. The classifier system is informed by synthetic training set 222. Given access to a selected document 301, the classifier system produces PII classifier results 309 that are in turn used by the aforementioned document handling module and combiner module.

This embodiment exposes uniform resource identifiers (URIs) such that users (e.g., user 305) can access shared electronic documents via the URI from any one or more of user device $\mathbf{307}_1$, device $\mathbf{307}_2$, . . . , and/or device $\mathbf{307}_N$. Additionally, this particular embodiment provides access to shared electronic documents of a storage facility via shared document access module 303. PII classifier 304 can access shared electronic documents either via the shared document access module (as shown) or via the storage facility. The shown PII classifier in turn comprises a scanner module 306 and an analysis module 308. The scanner module might be a "fast" and "cheap" detector that reports the likelihood of existence of PII in a selected document 301. Such a "fast" and "cheap" detector might be implemented as a RegEx-based detector. While such a RegEx-based detector might indeed be "fast" and "cheap", such a RegEx-based detector might erroneously over-identify and/or misclassify occurrences of PII. For example, the regular expression/matches a possible passport number of "12345678901" as well as a possible driver license number of "12345678901" (for some states) and also a possible telephone number of "12345678901". To more accurately classify a particular occurrence of such a string, analysis module 308 is called.

Further details regarding general approaches to scanning for PII are described in U.S. application Ser. No. 17/463,372 titled "DETECTION OF PERSONALLY IDENTIFIABLE INFORMATION" filed on Aug. 31, 2021, which is hereby incorporated by reference in its entirety.

PII classifier 304 might interoperate with a document handling component 312 and/or an event processor 314, and/or a combiner module 318. Strictly as one example scenario, it might happen that the scanner module is reporting a large number of documents that are coming from a particular user 305 and, in the same time epoch, the event processor reports that that particular user 305 has recently been uploading a large number of documents. By cross-referencing those two reports, and optionally by enriching the foregoing reports with the role of user 305 (e.g., "Recruiter"), a heuristic (e.g., rules 231 of FIG. 2B) might be defined or invoked (e.g., by operational elements of the document handling component) so as to consider that a document uploaded by a "Recruiter" user might more likely than not contain PII (e.g., when the heuristic test, "IF(role (user)="Recruiter" is TRUE). As such, the document handling component can attach metadata 316 to the document uploaded by the "Recruiter". In the event of future accesses to the uploaded document, the semantics of the attached metadata can inform whether or not to grant access to a requestor, and/or otherwise inform downstream processing as to how to handle dissemination (or redaction or destruction) of the document.

As another example of how the combiner module might interoperate with the PII classifier, the document handling component, and the event processor, consider that an original document might have an occurrence of the n-gram "passport number" in it. After the original document has been passed through OCR processing, the former n-gram "passport number" might be mis-scanned as "passport number". That mis-scan would prevent achievement of 100% confidence that the context around the mis-scanned "passport number" is PII. However, by considering additional factor(s) such as the knowledge that the original document that was scanned was stored in a folder that was named "Employee Passport Numbers", then by combining the meaning(s) of the additional factor(s) with the less than 100% confidence value emitted by the PII classifier, the likelihood that the context around the mis-scanned "passport number" can be increased (e.g., "nudged") to a higher confidence that the context indeed contains PII.

Cross referencing multiple reports can serve to identify potential malefactors. As examples, consider a case where the PII classifier identified a folder that has a lot of passport numbers (e.g., a lot of PII), then further consider the occurrence of an event or events that correspond to a download of the folder by user 305. The combiner module, based on outputs of document handling component 312 and/or outputs of event processor 314 can make a determination that user 305 is at least potentially a malefactor. Aspects of such a determination can be codified and stored in a storage facility 320. Specifically, the determination or suspicion that user 305 is a malefactor can cause changes to be made to any/all of content object storage 322, metadata storage 324, and event history storage 326.

Consider the situation where two different employees attempt to download a large number of documents. A first employee downloads materials that contain zero or only a small amount of PII, whereas the second employee attempts to download a large number of documents that include credit card numbers. The latter can be deemed to be a high risk event. In some content management systems the latter attempt can be blocked until such time as the high risk event has been vetted by an authority.

As another example of how the combiner works, if the topics in the folder (e.g., which topics are determined, implied, or inferred from the metadata) pertain to "banking information," then that determination, implication, or inference can be combined with one or more outputs of the PII classifier (e.g., the PII classifier results 309) to reach a confidence that a number value (e.g., a number value such as 5787123456780110) is more likely to be a credit card number rather than a product identifier (e.g., SKU). In some cases, the nature of a workflow and/or what specific portion or portions of workflow processing is underway over a selected document can inform additional context beyond the context that may have been extracted from a subject document. Many rules and/or heuristics can be considered by a combiner or other processing agents. For example, when there are two or more suspected PII phrases in a passage that contains a particular infotype, the PII phrase that is the closest to the matched infotype is weighted greater than other PII phrases that are farther from the matched infotype. Another example would be that candidate PII phrases must appear within "D" n-grams from the match, where distance "D" is a positive distance or a negative distance.

Figure 3B:
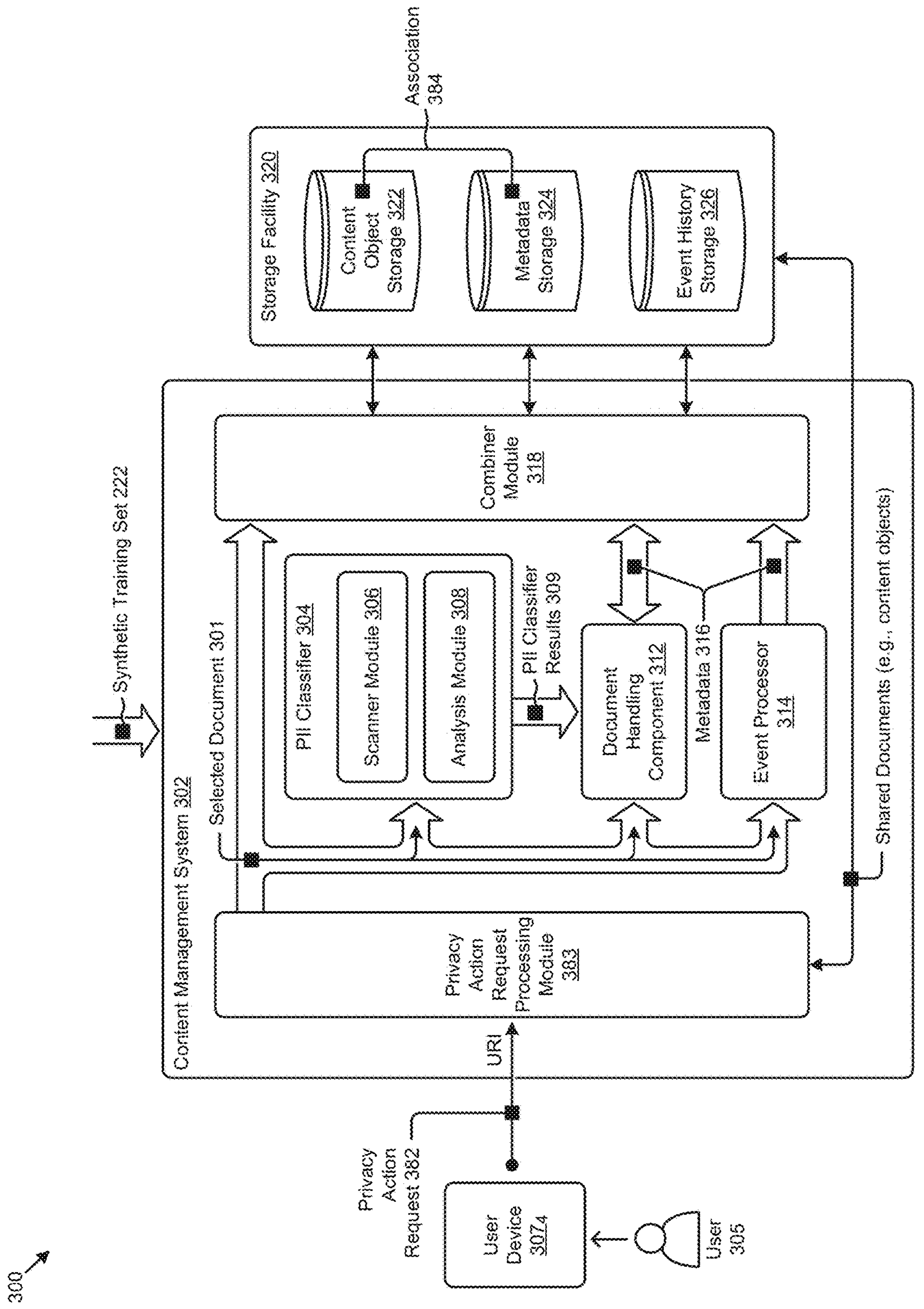

FIG. 3B depicts a second example electronic document collaboration system 300 as used for processing content objects that are classified as containing personally identifiable information. As an option, one or more variations of the second example electronic document collaboration system or any aspect thereof may be implemented in the context of the architecture and functionality of the embodiments described herein and/or in any environment.

The electronic document collaboration system of FIG. 3B includes computer-implemented modules that interoperate to implement privacy controls over electronic documents.

A user 305 raises a privacy action request 382, which privacy action request is sent from a user device $\mathbf{307}_4$ through a URI, and received into the shown privacy action request processing module 383. The privacy action request processing module interacts with the storage facility that stores content objects and its associated metadata on electronic storage media. The metadata is codified into machine-readable symbols or tags that refer to aspects of how the content objects are stored, and/or aspects of how the contents of the content objects are maintained (e.g., shared or not shared, duplicated or not duplicated, marked for deletion, marked for redaction, etc.). Metadata can be stored in the content objects themselves or, additionally or alternatively, and as shown, metadata pertaining to content objects can be stored separately from its associated content objects, where a particular content object and its metadata are related by association 384. In some embodiments, the association itself is metadata.

The receipt of a privacy action request into the privacy action request processing module 383 causes a demand (e.g., a demand to change how certain content objects associated with the user are handled) to be acted upon. More specifically, the privacy action request processing module interacts with a PII classifier 304 to identify personally identifiable information. The existence and nature of personally identifiable information is output from the PII classifier. The PII classifier is trained on training set entries that are generated by (i) associating a hintword with a corresponding label, (ii) generating an n-gram comprising words that are randomly selected from a repository of natural language words, and then (iii) injecting the hintword into the n-gram.

When PII is detected, then the document handling component 312 can initiate actions to be performed over content objects that contain the PII. Such actions can include, but are not limited to, actions that modify at least some of any content objects that are determined to contain the user's PII (e.g., redactions), actions that modify at least some of the metadata corresponding to certain content objects (e.g., sharing boundary modifications), or actions that affect how the certain content objects are stored on (or deleted from) the storage facility 320.

Now, referring again to the synthetic training set 222, which is shown as an input to the content management system, it can now be appreciated that such a synthetic training set can be generated outside of the content management system. More particularly, it can now be appreciated that such a synthetic training set can be generated without any inputs from the content management system. Still more particularly, it can now be appreciated that such a synthetic training set can be generated using only combinations of randomly-selected natural language words and hintword associations. A training set entry generation technique that uses natural language word noise in combination with hintwords to generate synthetic training set entries is shown and described as pertains to FIG. 4A.

Figure 4A:
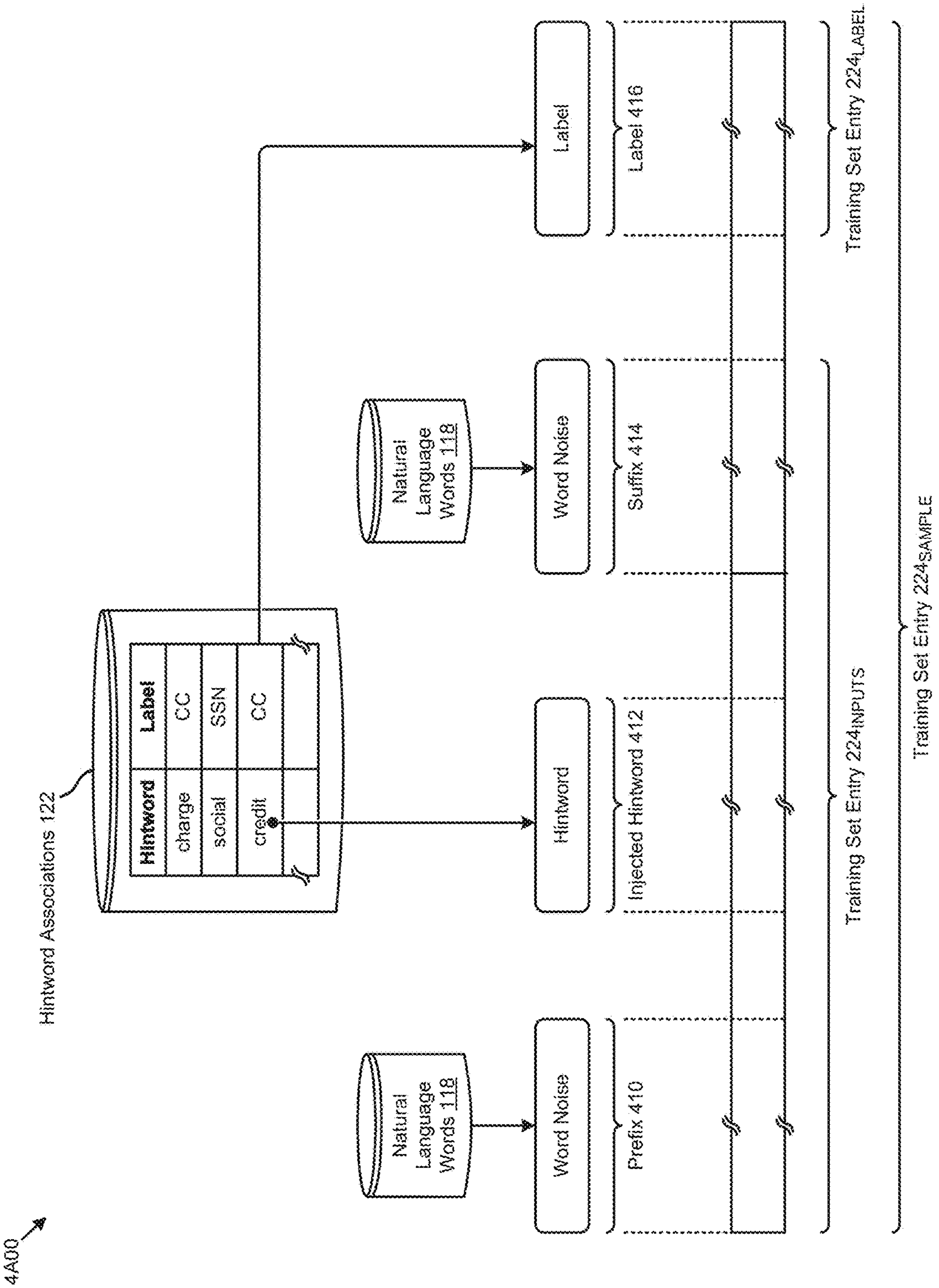
FIG. 4A presents a training set entry generation technique that uses natural language word noise in combination with hintwords to generate synthetic training set entries, according to some embodiments.

FIG. 4A presents a training set entry generation technique 4A00 that uses natural language word noise in combination with hintwords to generate synthetic training set entries. As an option, one or more variations of training set entry generation technique 4A00 or any aspect thereof may be implemented in the context of the architecture and functionality of the embodiments described herein and/or in any environment.

The training set entry generation technique uses natural language word noise in combination with hintwords to generate synthetic training set entries. More specifically, a particular training set entry $\mathbf{224}_{SAMPLE}$ is composed of a first portion shown as training set entry $\mathbf{224}_{INPUTS}$ and a second portion shown as training set entry $\mathbf{224}_{LABEL}$. In this particular embodiment, the association between the first portion and the second portion is established by virtue of the second portion being appended to the first portion, thereby corresponding the second portion with the first portion. This is merely an example embodiment and any known technique can be used to associate a second portion with a corresponding first portion. The reason for the association is that when a classifier (e.g., a classifier that is trained using a synthetic training set) finds a match between a particular passage from a user document and a first portion of a particular synthetic training set entry, the label 416 of the corresponding second portion is associated with that particular passage from the user document.

In this particular embodiment, the first portion of a particular synthetic training set entry is composed of a prefix 410, an injected hintword 412, and a suffix 414. The prefix is composed of word noise, wherein the word noise is formed by randomly drawing n-grams from the repository of natural language words 118. The suffix is also composed of word noise, wherein the word noise is formed by randomly drawing n-grams from the repository of natural language words 118. The repository of natural language words that is used for forming the prefix can be the same repository of natural language words that is used for forming the suffix. Alternatively the repository of natural language words that is used for forming the prefix can be different from the repository of natural language words that is used for forming the suffix.

In some embodiments, a repository of natural language words may include natural language words that are tagged with a part of speech. When drawing words from a repository of part-of-speech-tagged natural language words, words that correspond to a particular part of speech can be randomly drawn and combined with words that correspond to a different particular part of speech. As such, the randomly-drawn words can be combined to form random natural language n-gram patterns that comport with language-specific grammatical constructions. One possible technique for generating training set entries that include random natural language n-gram patterns is shown and described as pertains to FIG. 4B.

Figure 4B:
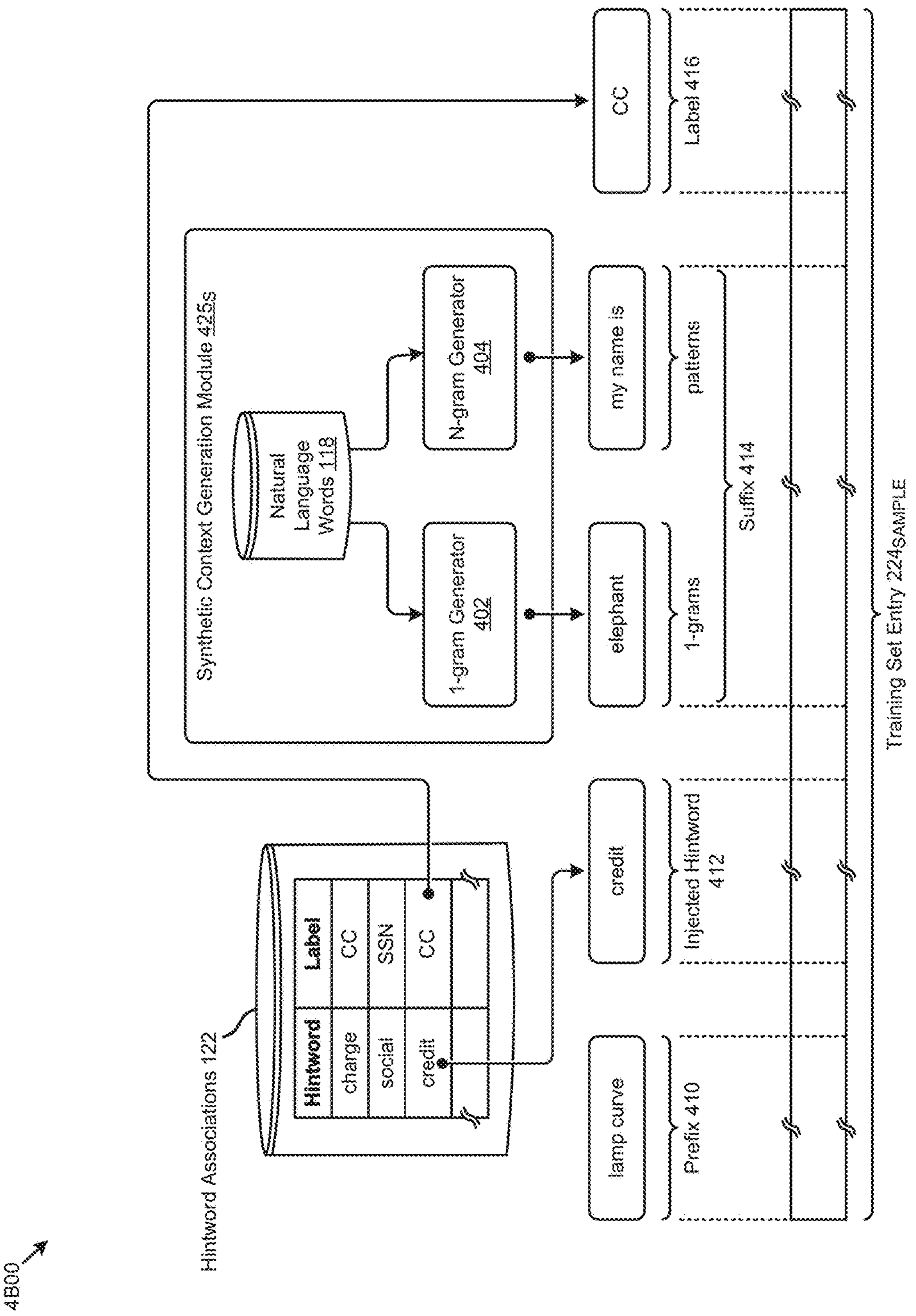
FIG. 4B presents a first alternate training set entry generation technique that uses random natural language n-gram patterns in combination with hintwords to generate synthetic context, according to some embodiments.

FIG. 4B presents a first alternate training set entry generation technique 4B00 that uses random natural language n-gram patterns in combination with hintwords to generate synthetic context. As an option, one or more variations of first alternate training set entry generation technique 4B00 or any aspect thereof may be implemented in the context of the architecture and functionality of the embodiments described herein and/or in any environment.

The figure is being presented to illustrate a particular training set entry generation technique where the training set entry includes random natural language n-gram patterns. FIG. 4B differs from FIG. 4A at least in that FIG. 4B includes an synthetic context generation module $\mathbf{425}_S$. This module is configured with two different generator types, namely, a 1-gram generator 402 that is configured to be able to generate randomly-drawn 1-grams from a repository of natural language words 118, and an n-gram generator 404 that is configured to be able to generate phrase patterns that comport with language-specific grammatical constructions.

In the specific example of FIG. 4B, the prefix 410 is composed of two randomly drawn words, namely "lamp" and "curve". The injected hintword 412 is the hintword "credit", which particular hintword is associated with the label "CC". The suffix 414 is composed of a 1-gram, namely "elephant" followed by an n-gram pattern composed of "my name is". Those of ordinary skill in the art will recognize that the n-gram pattern "my name is" comports with the natural language pattern {possessive, noun, verb}. Use of random n-gram phrase patterns that comport with language-specific grammatical constructions can yield a particular degree of classifier accuracy with fewer training set entries than would be required to yield the same particular degree of classifier accuracy in absence of random n-gram phrase patterns that comport with language-specific grammatical constructions. Those of skill in the art will recognize that certain distributions of word noise are better than other distributions of word noise when the word noise is used in training set entries that are in turn used for training a PII classification model.

The shown second alternate training set entry generation technique 4B00 can be used singly, or in combination with other training set entry generation techniques. In fact, there are many additional or alternate training set entry generation techniques that can be applied when generating synthetic training set entries. One such alternate training set entry generation technique is shown and described as pertains to FIG. 4C.

Figure 4C:
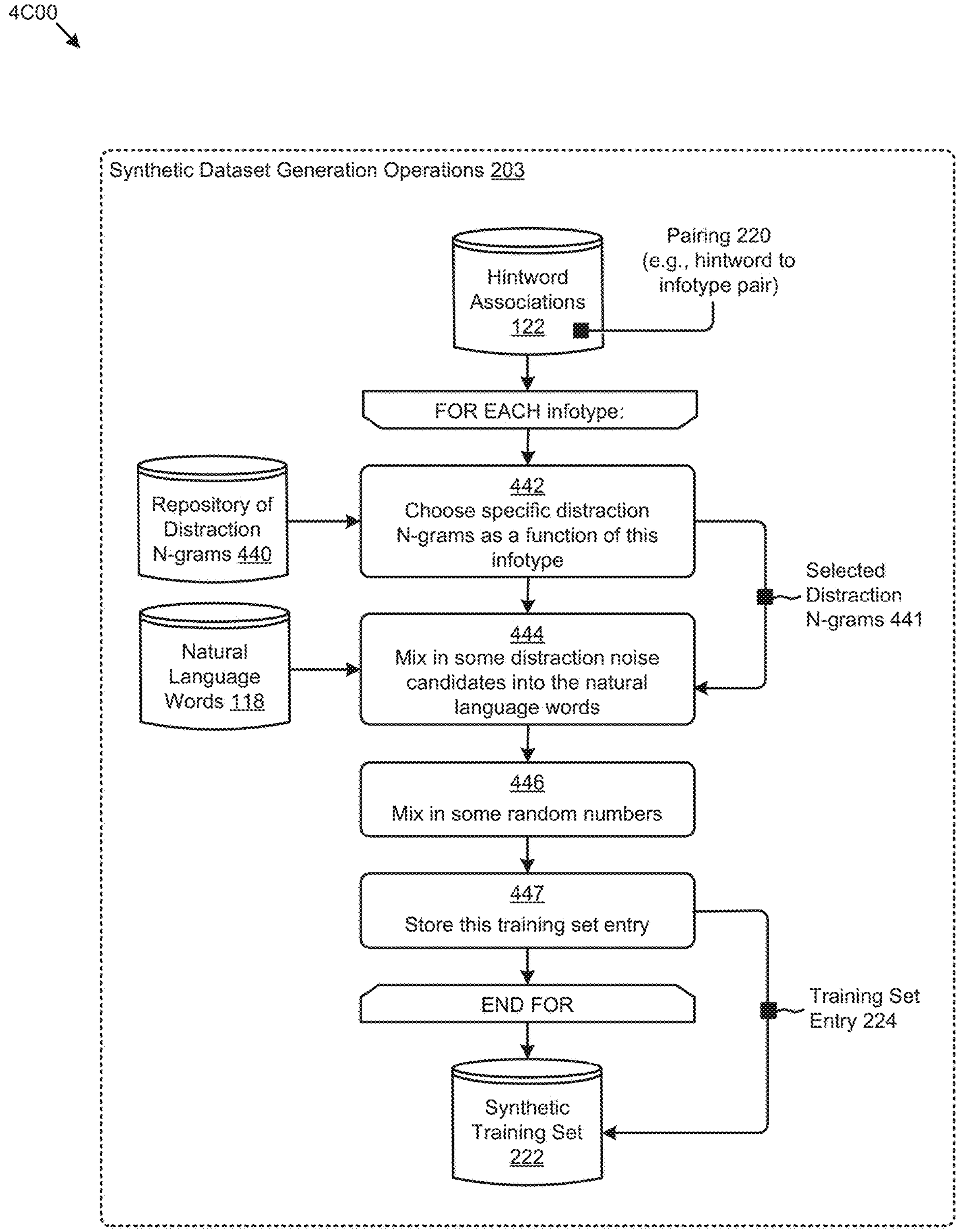
FIG. 4C presents a second alternate training set entry generation technique that uses natural language word noise in combination with distraction n-grams to generate synthetic context, according to some embodiments.

FIG. 4C presents a second alternate training set entry generation technique 4C00 that uses natural language word noise in combination with distraction n-grams to generate synthetic context. As an option, one or more variations of second alternate training set entry generation technique 4C00 or any aspect thereof may be implemented in the context of the architecture and functionality of the embodiments described herein and/or in any environment.

The shown second alternate training set entry generation technique 4C00 can be used singly or in combination with other training set entry generation techniques. In this particular embodiment, specially-selected n-grams are selected based on a particular infotype. Such specially-selected n-grams are sometimes needed in a machine learning model such that a classifier based on the machine learning model exhibits a very fine discrimination line between predicted infotypes. Such specially-selected distraction n-grams are included in training set entries so as to teach the machine learning system that it should discriminate between hintwords that are closer to a candidate PII match.

Infotypes of interest may be drawn from the foregoing hintword associations 122. A sequence of operations are performed for each infotype of interest. The shown sequence commences at step 442 where a specific one or more distraction n-grams are selected from a repository of distraction n-grams 440. The selected distraction n-grams 441 are mixed in (step 444) with natural language words taken randomly from a repository of natural language words 118. These selected distraction n-grams 441 are mixed in with the natural language words to form a part of the training entry context. Additionally or alternatively one or more random numbers are mixed into a synthetic training set entry (step 446). This is because random numbers are sometime needed in a machine learning model such that a classifier based on the machine learning model exhibits a very fine discrimination line between predicted infotypes. Strictly as one example, a classifier based on a neural network might be overfitted in absence of n-grams that are known to be completely disassociated with any corresponding infotype.

After mixing random numbers into applicable portion of a training set entry, that training set entry 224 can be stored (step 447) into the synthetic training set 222. The synthetic training set can be used in the foregoing embodiments to train classifiers. Such classifiers exhibit high accuracy, yet without using any portion of the user documents to be classified.

ADDITIONAL EMBODIMENTS OF THE DISCLOSURE

Instruction Code Examples

Figure 5:
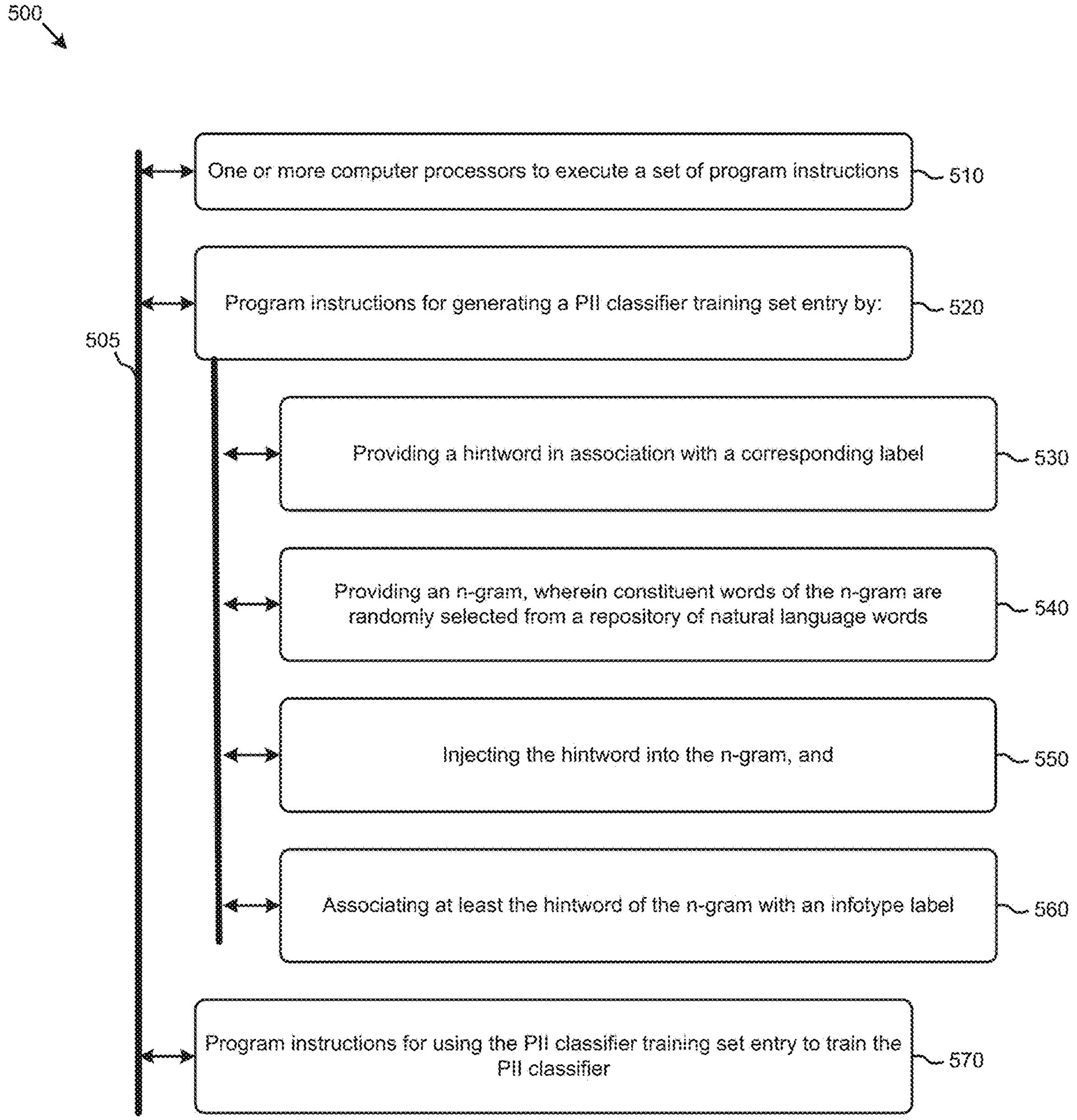
FIG. 5 depicts system components as arrangements of computing modules that are interconnected so as to implement certain of the herein-disclosed embodiments.

FIG. 5 depicts a system 500 as an arrangement of computing modules that are interconnected so as to operate cooperatively to implement certain of the herein-disclosed embodiments. This and other embodiments present particular arrangements of elements that, individually or as combined, serve to form improved technological processes that address training a machine learning model when real-world training set data is not available. The partitioning of system 500 is merely illustrative and other partitions are possible.

Variations of the foregoing may include more or fewer of the shown modules. Certain variations may perform more or fewer (or different) steps and/or certain variations may use data elements in more, or in fewer, or in different operations. As an option, the system 500 may be implemented in the context of the architecture and functionality of the embodiments described herein. Of course, however, the system 500 or any operation therein may be carried out in any desired environment.

The system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with any other operations over communication path 505. The modules of the system can, individually or in combination, perform method operations within system 500. Any operations performed within system 500 may be performed in any order unless as may be specified in the claims.

The shown embodiment implements a portion of a computer system, presented as system 500, comprising one or more computer processors to execute a set of program code instructions (module 510) and modules for accessing memory to hold program code instructions for generating a PII classifier training set entry (module 520) by: providing a hintword in association with a corresponding label (module 530); providing an n-gram, wherein constituent words of the n-gram are randomly selected from a repository of natural language words (module 540); injecting the hintword into the n-gram (module 550); and associating at least the hintword of the n-gram with an infotype label (module 560); then using the PII classifier training set entry to train the PII classifier (module 570).

Some embodiments include variations in the operations performed, and some embodiments include variations of aspects of the data elements used in the operations. Strictly as examples, in addition to the foregoing, embodiments may include program code for selecting one or more distraction words from a distraction word repository and mixing in the one or more distraction words into the training set entry. Additionally or alternatively, embodiments may include program code for mixing in one or more random numbers into the first portion of a training set entry.

Still further, some embodiments implement methods for maintaining privacy over PII-containing items (e.g., documents or metadata) in an electronic document collaboration system. As an example of how to integrate and use a PII classifier to maintain privacy in an electronic document collaboration system, consider that such an electronic document collaboration system exposes URIs through which access to the shared electronic documents from a user device is provided. As such, any user from any user device can at least potentially access PII-containing items via the URI access point. This sets up the unwanted scenario that at least potentially permits one user to access the PII of a different user.

To address this potential pitfall, a PII classifier and a document handling component are integrated into the electronic document collaboration system. In accordance with the foregoing, the PII classifier is trained to classify personally identifiable information that might be present in the electronic documents. More specifically, the PII classifier is trained based on expert-generated associations between a plurality of hintwords and corresponding infotypes, and a training set for the PII classifier is generated such that individual training set entries include a hintword and natural language noise, which natural language noise is formed of randomly-selected n-grams taken from a repository of natural language words.

A document handling component and corresponding usage techniques can isolate electronic documents belonging to one tenant from access by another tenant. In some embodiments, a collaboration system supports multiple tenants by managing the metadata pertaining to the content objects belonging to different tenants. Moreover, the PII classifier can be configured such that no training set entries that are used to train the PII classifier are derived by reading first electronic documents of a first tenant, such that training set entries are derived by reading second electronic documents of a second tenant.

Once the PII classifier has been trained, then upon receiving a request to access a particular document from among the shared electronic documents, the PII classifier can be run over the particular requested document to produce PII classifier results that indicate whether or not there is PII within that particular document or its metadata. Based on the PII classifier results, then the aforementioned document handling component can make a decision to disallow (or allow) access to the document. In some situations, the PII classifier results include an indication as to the owner of the PII (e.g., the detected PII is "John Smith's home address"). The semantics of the output(s) of the document handling component can be used to inform whether or not (and how to) perform downstream operations such as redaction of the detected PII. In some cases, downstream processes cause deletion of the particular document. In some cases, downstream processes cause complete expunging of the particular document and any copies from the electronic document collaboration system.

System Architecture Overview

Additional System Architecture Examples

Figure 6A:
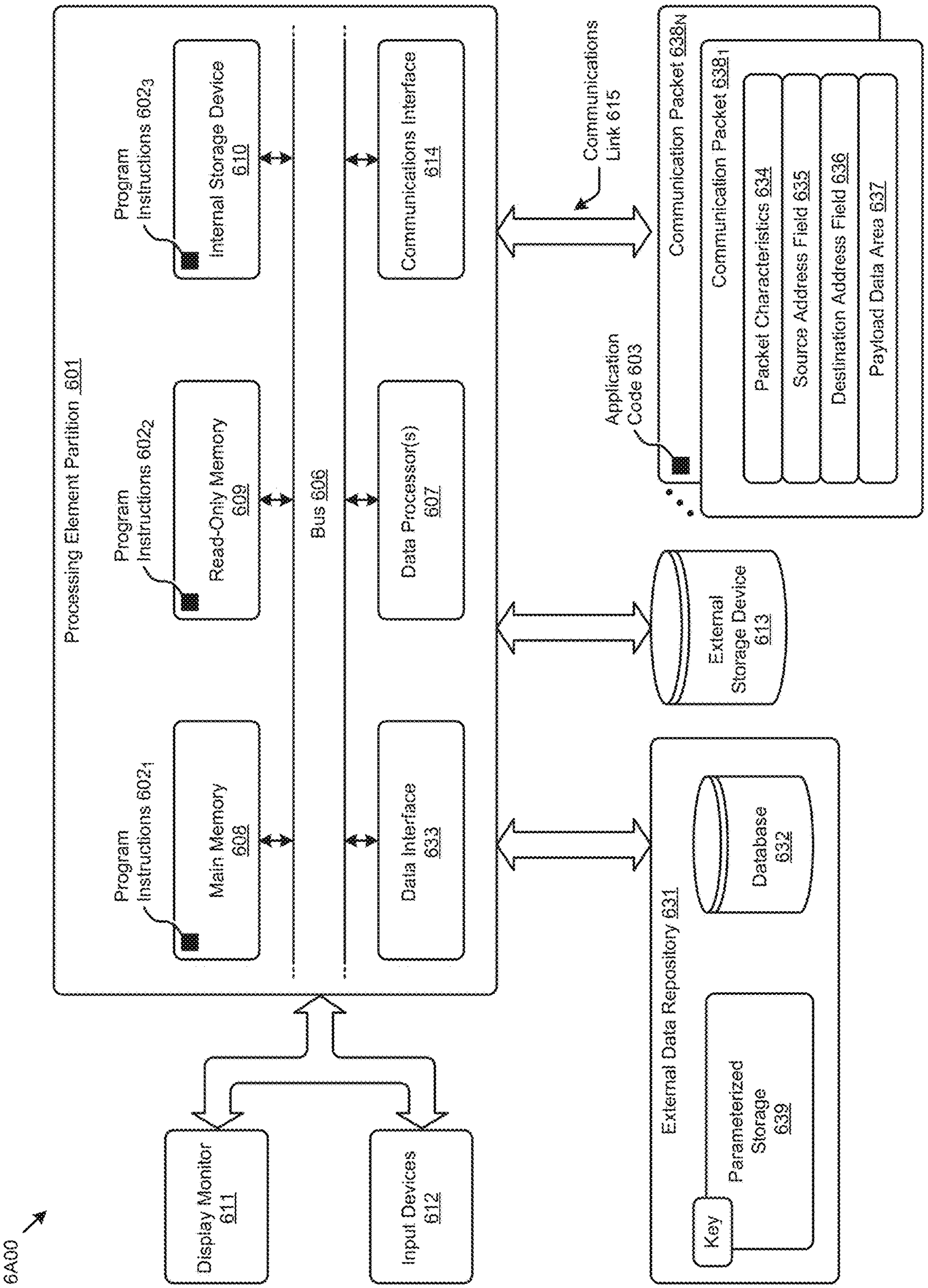
FIG. 6A and FIG. 6B present block diagrams of computer system architectures having components suitable for implementing embodiments of the present disclosure and/or for use in the herein-described environments.

FIG. 6A depicts a block diagram of an instance of a computer system 6A00 suitable for implementing embodiments of the present disclosure. Computer system 6A00 includes a bus 606 or other communication mechanism for communicating information. The bus interconnects subsystems and devices such as a central processing unit (CPU), or a multi-core CPU (e.g., data processor 607), a system memory (e.g., main memory 608, or an area of random access memory (RAM)), a non-volatile storage device or non-volatile storage area (e.g., read-only memory 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601, however other partitions are possible. Computer system 6A00 further comprises a display 611 (e.g., CRT or LCD), various input devices 612 (e.g., keyboard, cursor control), and an external data repository 631.

According to an embodiment of the disclosure, computer system 6A00 performs specific operations by data processor 607 executing one or more sequences of one or more program instructions contained in a memory. Such instructions (e.g., program instructions 6021, program instructions 6022, program instructions 6023, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 6A00 performs specific networking operations using one or more instances of communications interface 614. Instances of communications interface 614 may comprise one or more networking ports that are configurable (e.g., pertaining to speed, protocol, physical layer characteristics, media access characteristics, etc.) and any particular instance of communications interface 614 or port thereto can be configured differently from any other particular instance. Portions of a communication protocol can be carried out in whole or in part by any instance of communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

Communications link 615 can be configured to transmit (e.g., send, receive, signal, etc.) any types of communications packets (e.g., communication packet $\mathbf{638}_1$, communication packet $\mathbf{638}_N$) comprising any organization of data items. The data items can comprise a payload data area 637, a destination address 636 (e.g., a destination IP address), a source address 635 (e.g., a source IP address), and can include various encodings or formatting of bit fields to populate packet characteristics 634. In some cases, the packet characteristics include a version identifier, a packet or payload length, a traffic class, a flow label, etc. In some cases, payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of a computer system 6A00. According to certain embodiments of the disclosure, two or more instances of computer system 6A00 coupled by a communications link 615 (e.g., LAN, public switched telephone network, or wireless network) may perform the sequence of instructions required to practice embodiments of the disclosure using two or more instances of components of computer system 6A00.

Computer system 6A00 may transmit and receive messages such as data and/or instructions organized into a data structure (e.g., communications packets). The data structure can include program instructions (e.g., application code 603), communicated through communications link 615 and communications interface 614. Received program instructions may be executed by data processor 607 as it is received and/or stored in the shown storage device or in or upon any other non-volatile storage for later execution. Computer system 6A00 may communicate through a data interface 633 to a database 632 on an external data repository 631. Data items in a database can be accessed using a primary key (e.g., a relational database primary key).

Processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to generating high-performance synthetic datasets to train a PII classifier. A module may include one or more state machines and/or combinational logic used to implement or facilitate the operational and/or performance characteristics pertaining to generating high-performance synthetic datasets to train a PII classifier.

Various implementations of database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of generating high-performance synthetic datasets to train a PII classifier). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to generating high-performance synthetic datasets to train a PII classifier, and/or for improving the way data is manipulated when performing computerized operations pertaining to tuning synthetic datasets for PII models in a content management system setting.

Figure 6B:
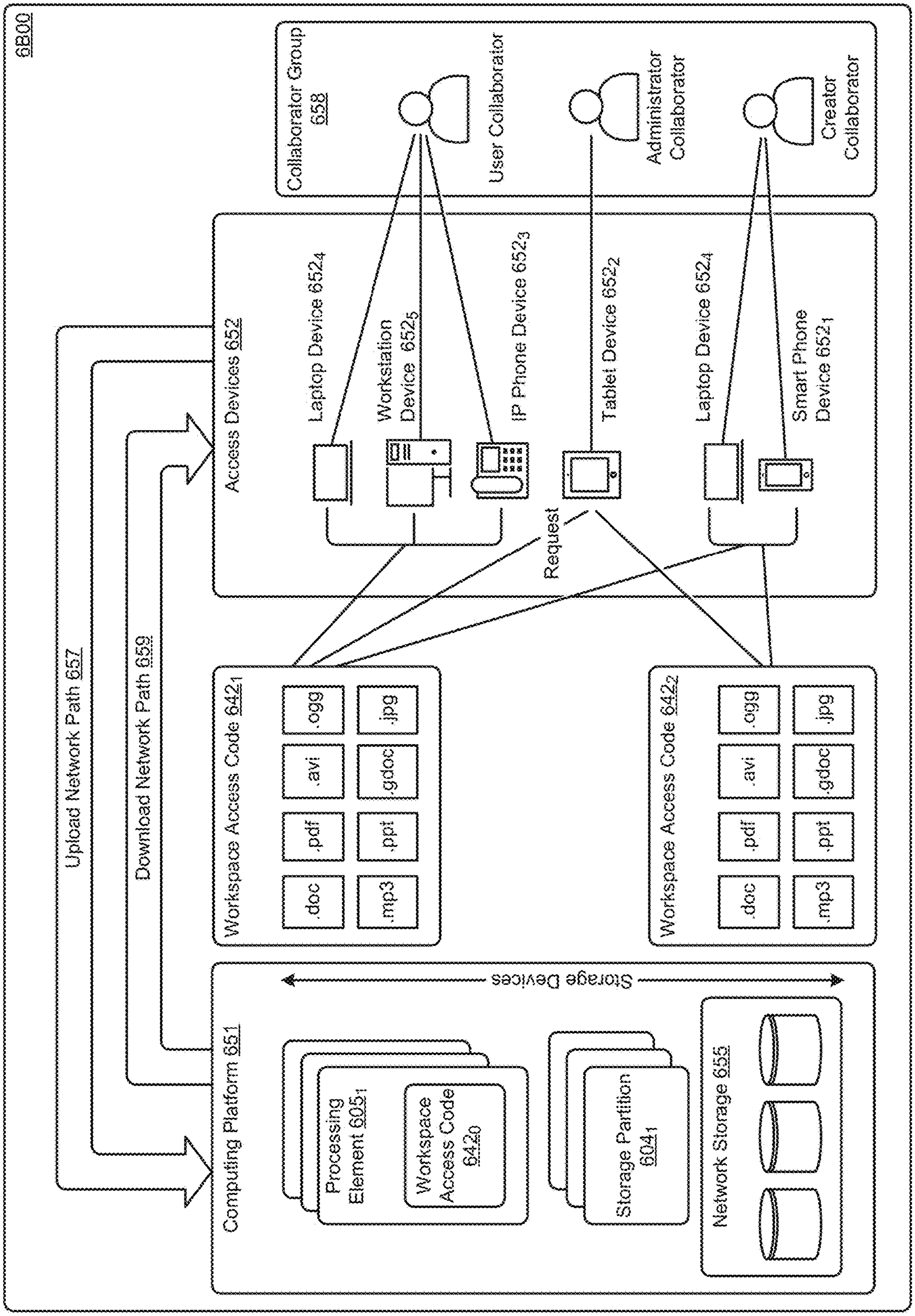

FIG. 6B depicts a block diagram of an instance of a cloud-based environment 6B00. Such a cloud-based environment supports access to workspaces through the execution of workspace access code (e.g., workspace access code $\mathbf{642}_0$, workspace access code $\mathbf{642}_1$, and workspace access code $\mathbf{642}_2$). Workspace access code can be executed on any of access devices 652 (e.g., laptop device $\mathbf{652}_4$, workstation device $\mathbf{652}_5$, IP phone device $\mathbf{652}_3$, tablet device $\mathbf{652}_2$, smart phone device $\mathbf{652}_1$, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to any particular user or any particular group of users.

A group of users can form a collaborator group 658, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 651, including in a middleware setting. As shown, a portion of the workspace access code resides in and can be executed on one or more processing elements (e.g., processing element $\mathbf{605}_1$). The workspace access code can interface with storage devices such as networked storage 655. Storage of workspaces and/or any constituent files or objects, and/or any other code or scripts or data can be stored in any one or more storage partitions (e.g., storage partition $\mathbf{604}_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 657). A stored workspace can be delivered to a particular user and/or shared with other particular users via a download (e.g., a download from a processing element to an access device over a download network path 659).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for implementing privacy controls over certain data of an electronic document collaboration system, the method comprising:

identifying a storage facility that stores content objects and associated metadata, wherein the associated metadata comprises one or more of, first metadata pertaining to storage of the content objects onto electronic storage media of the storage facility, or second metadata pertaining to access characteristics of the content objects on the electronic storage media of the storage facility;

identifying one or more content objects in the storage facility, wherein the one or more content objects are analyzed to determine modifications to individual ones of the one or more content object or the associated metadata;

analyzing the one or more content objects to identify personally identifiable information (PII) within the individual ones of the one or more content objects, wherein identification of the PII is based at least in part on outputs of a PII classifier, and wherein training set entries used for training the PII classifier are generated by (i) providing a hintword in association with a corresponding label, (ii) providing an n-gram, wherein constituent words of the n-gram are randomly selected from a repository of natural language words, and (iii) injecting the hintword into the n-gram; and modifying the one or more content objects or the associated metadata based at least in part upon the identification of the PII in the one or more content objects, wherein the one or more content objects or the associated metadata is modified to change at least one of a content object itself, first metadata of the content object pertaining to storage characteristics of the object, or second metadata of the content object to change access characteristics of the content object.

2. The method of claim 1, further comprising combining an aspect of the outputs of the PII classifier with one or more events of the electronic document collaboration system to determine a downstream operation.

3. The method of claim 1, further comprising initiating a downstream operation to modify the associated metadata of one or more of the one or more content objects to limit sharing or dissemination of the electronic document based at least in part upon the PII.

4. The method of claim 1, further comprising initiating a downstream operation, wherein the downstream operation is one of, setting a retention period of one or more of the one or more content objects, or modifying the associated metadata of one or more of the one or more content objects to set a sharing boundary.

5. The method of claim 1, further comprising initiating a downstream operation, wherein the downstream operation is one of, redacting portions of one or more of the one or more content objects that contain PII, or preparing a listing of electronic documents that contain PII.

6. The method of claim 1, wherein the PII classifier is used to detect first PII in a first further electronic document of a first tenant, and wherein the same PII classifier is used to detect second PII in a second further electronic document of a second tenant.

7. The method of claim 1, wherein the one or more content object or the associated metadata are modified to delete the content object itself.

8. A non-transitory computer readable medium having stored thereon a sequence of instructions which, when stored in memory and executed by one or more processors causes the one or more processors to perform a set of acts for implementing privacy controls over certain data of an electronic document collaboration system, the set of acts comprising:

identifying a storage facility that stores content objects and associated metadata, wherein the associated metadata comprises one or more of, first metadata pertaining to storage of the content objects onto electronic storage media of the storage facility, or second metadata pertaining to access characteristics of the content objects on the electronic storage media of the storage facility;

identifying one or more content objects in the storage facility, wherein the one or more content objects are analyzed to determine modifications to individual ones of the one or more content objects or the associated metadata;

analyzing the one or more content objects to identify personally identifiable information (PII) within the individual ones of the one or more content objects, wherein identification of the PII is based at least in part on outputs of a PII classifier, and wherein training set entries used for training the PII classifier are generated by (i) providing a hintword in association with a corresponding label, (ii) providing an n-gram, wherein constituent words of the n-gram are randomly selected from a repository of natural language words, and (iii) injecting the hintword into the n-gram; and modifying the one or more content objects or the associated metadata based at least in part upon the identification of the PII in the one or more content objects, wherein the one or more content objects or the associated metadata is modified to change at least one of a content object itself, first metadata of the content object pertaining to storage characteristics of the object, or second metadata of the content object to change to access characteristics of the content object.

9. The non-transitory computer readable medium of claim 8, further comprising instructions which, when stored in memory and executed by the one or more processors causes the one or more processors to perform acts of combining an aspect of the outputs of the PII classifier with one or more events of the electronic document collaboration system to determine a downstream operation.

10. The non-transitory computer readable medium of claim 8, further comprising instructions which, when stored in memory and executed by the one or more processors causes the one or more processors to perform acts of initiating a downstream operation to modify the associated metadata of one or more of the one or more content objects to limit sharing or dissemination of the electronic document based at least in part upon the PII.

11. The non-transitory computer readable medium of claim 8, further comprising instructions which, when stored in memory and executed by the one or more processors causes the one or more processors to perform acts of initiating a downstream operation, wherein the downstream operation is one of, setting a retention period of one or more of the one or more content objects, or modifying the associated metadata of one or more of the one or more content objects to set a sharing boundary.

12. The non-transitory computer readable medium of claim 8, further comprising instructions which, when stored in memory and executed by the one or more processors causes the one or more processors to perform acts of initiating a downstream operation, wherein the downstream operation is one of, redacting portions of one or more of the one or more content objects that contain PII, or preparing a listing of electronic documents that contain PII.

13. The non-transitory computer readable medium of claim 8, wherein the PII classifier is used to detect first PII in a first further electronic document of a first tenant, and wherein the same PII classifier is used to detect second PII in a second further electronic document of a second tenant.

14. The non-transitory computer readable medium of claim 8, wherein the one or more content object or the associated metadata are modified to delete the content object itself.

15. A system for implementing privacy controls over certain data of an electronic document collaboration system, the system comprising:

a storage medium having stored thereon a sequence of instructions; and one or more processors that execute the sequence of instructions to cause the one or more processors to perform a set of acts, the set of acts comprising, identifying a storage facility that stores content objects and associated metadata, wherein the associated metadata comprises one or more of, first metadata pertaining to storage of the content objects onto electronic storage media of the storage facility, or second metadata pertaining to access characteristics of the content objects on the electronic storage media of the storage facility;

identifying one or more content objects in the storage facility, wherein the one or more content objects are analyzed to determine modifications to individual ones of the one or more content object or the associated metadata;

analyzing the one or more content objects to identify personally identifiable information (PII) within the individual ones of the one or more content objects, wherein identification of the PII is based at least in part on outputs of a PII classifier, and wherein training set entries used for training the PII classifier are generated by (i) providing a hintword in association with a corresponding label, (ii) providing an n-gram, wherein constituent words of the n-gram are randomly selected from a repository of natural language words, and (iii) injecting the hintword into the n-gram; and modifying the one or more content objects or the associated metadata based at least in part upon the identification of the PII in the one or more content objects, wherein the one or more content objects or the associated metadata is modified to change at least one of a content object itself, first metadata of the content object pertaining to storage characteristics of the object, or second metadata of the content object to change access characteristics of the content object.

16. The system of claim 15, further comprising combining an aspect of the outputs of the PII classifier with one or more events of the electronic document collaboration system to determine a downstream operation.

17. The system of claim 15, further comprising initiating a downstream operation to modify the associated metadata of one or more of the one or more content objects to limit sharing or dissemination of the electronic document based at least in part upon the PII.

18. The system of claim 15, further comprising initiating a downstream operation, wherein the downstream operation is one of, setting a retention period of one or more of the one or more content objects, or modifying the associated metadata of one or more of the one or more content objects to set a sharing boundary.

19. The system of claim 15, further comprising initiating a downstream operation, wherein the downstream operation is one of, redacting portions of one or more of the one or more content objects that contain PII, or preparing a listing of electronic documents that contain PII.

20. The system of claim 15, wherein the PII classifier is used to detect first PII in a first further electronic document of a first tenant, and wherein the same PII classifier is used to detect second PII in a second further electronic document of a second tenant.

* * * * *